United States Patent [19]

Minovitch

[11] 4,148,260
[45] * Apr. 10, 1979

[54] HIGH SPEED TRANSIT SYSTEM

[76] Inventor: Michael A. Minovitch, 2832 St. George St. Apt. 6, Los Angeles, Calif. 90027

[*] Notice: The portion of the term of this patent subsequent to May 4, 1993, has been disclaimed.

[21] Appl. No.: 682,085

[22] Filed: Apr. 30, 1976

Related U.S. Application Data

[63] Continuation-in-part of Ser. No. 466,609, May 3, 1974, Pat. No. 3,954,064, which is a continuation-in-part of Ser. No. 438,230, Jan. 31, 1974, Pat. No. 4,075,948.

[51] Int. Cl.² .................. B61B 13/10; B61B 13/08
[52] U.S. Cl. .................. 104/138 R; 49/68; 104/148 MS; 104/148 LM; 105/365; 114/335; 138/107
[58] Field of Search .... 104/138 R, 148 MS, 148 LM; 105/150, 365; 310/67 R, 74, 113; 244/161, 137 P; 49/68, 482; 61/69 R, 83; 114/16.6; 138/107

[56] References Cited

U.S. PATENT DOCUMENTS

| 432,615 | 7/1890 | Henning | 104/138 R |
| 891,416 | 6/1908 | Fenyö | 104/138 R X |
| 1,772,459 | 8/1930 | Grieshaber | 61/69 R X |
| 2,114,038 | 4/1938 | Updegraff | 61/83 |
| 2,488,287 | 11/1949 | Goddard | 104/138 R UX |
| 2,589,453 | 3/1952 | Storsand | 310/74 X |
| 2,942,816 | 6/1960 | Dustie | 244/137 P |
| 3,404,638 | 10/1968 | Edwards | 104/138 R X |
| 3,610,166 | 10/1971 | Ellzey | 105/150 |
| 3,656,436 | 4/1972 | Edwards | 104/138 R |
| 3,683,216 | 8/1972 | Post | 310/67 |
| 3,738,281 | 6/1973 | Waidelich | 104/148 MS X |
| 3,899,979 | 8/1975 | Godsey, Jr. | 104/148 MS |
| 3,946,571 | 3/1976 | Pate et al. | 61/69 R |
| 3,952,976 | 4/1976 | Fletcher et al. | 244/161 X |
| 3,954,064 | 5/1976 | Minovitch | 104/138 R |

FOREIGN PATENT DOCUMENTS 1035764  7/1966  United Kingdom ............ 104/148 MS Primary Examiner—Francis S. Husar
Assistant Examiner—Randolph A. Reese
Attorney, Agent, or Firm—Christie, Parker & Hale

[57] ABSTRACT

A high speed ground transportation system, is suspended in an underground vacuum tube by a frictionless magnetic suspension system and propelled by gravity. The tubes are suspended inside deep underground tunnels from anchor points near each adjacent station and follow smooth catenary curves similar to the main suspension cables of a suspension bridge. Gravity propulsion is accomplished by allowing the vehicle to coast down the descending arc of the tube, during which time it is accelerated by gravity, and decelerating by gravitational braking while coasting up the tube's ascending arc. Thus, the trip is accomplished by transforming the vehicle's gravitational potential energy at one station into kinetic energy and back into gravitational potential energy at the next station. Excess kinetic energy arising from coasting between stations having different elevations is supplied or absorbed by on-board linear motor/generators that provide supplementary propulsion or regenerative braking. These linear motor/generators draw and return energy to an on-board flywheel kinetic energy storage system. Passenger and cargo transfer between the vehicle's interior and station is made without removing the vacuum environment of the vehicle, by providing air-locks through the tube walls at the station.

54 Claims, 25 Drawing Figures

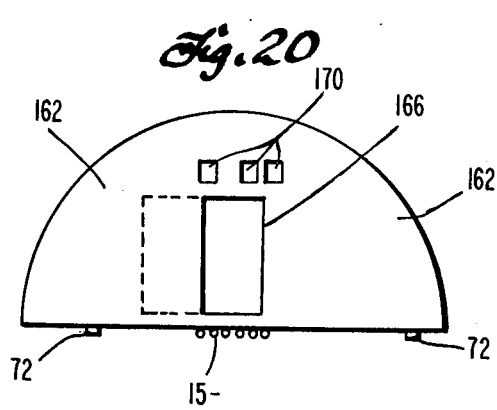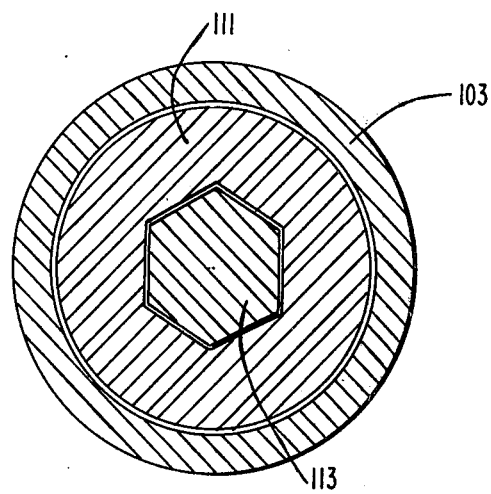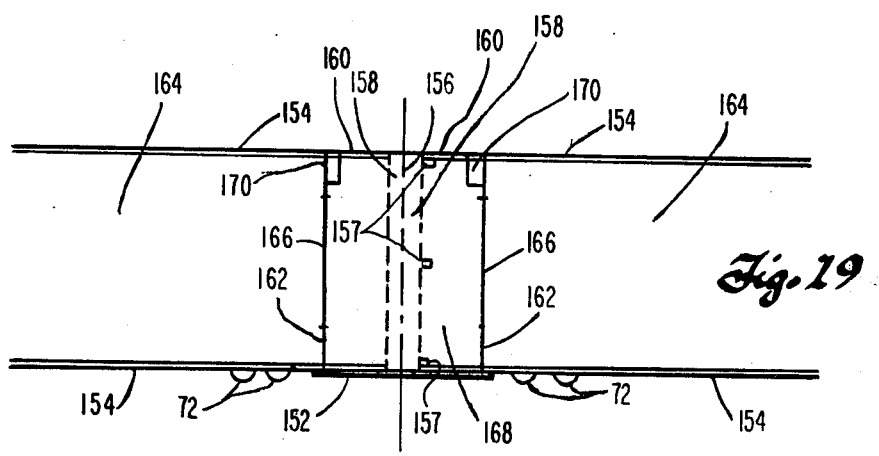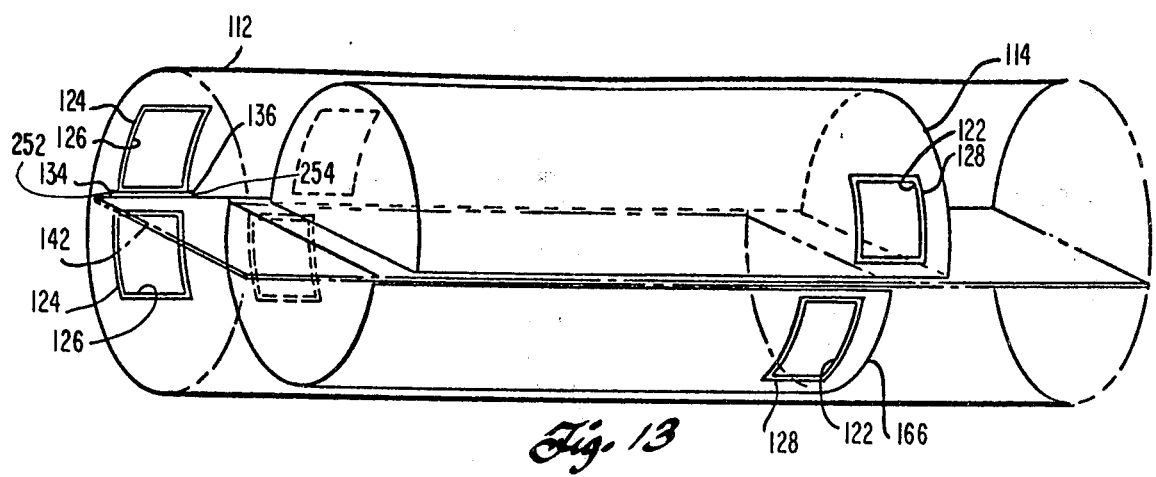

HIGH SPEED TRANSIT SYSTEM

This application is a Continuation-in-Part of U.S. Patent application Ser. No. 466,609, filed May 3, 1974, now U.S. Pat. No. 3,954,064, which is itself a Continuation-in-Part of U.S. Patent application Ser. No. 438,230, filed Jan. 31, 1974, now U.S. Pat. No. 4,075,948.

BACKGROUND

This invention concerns improvements in the gravity propelled transportation system disclosed in my United States patent application Ser. No. 438,230 filed Jan. 31, 1974, now U.S. Pat. No. 4,075,948, and patent application Ser. No. 466,609, filed May 3, 1974, entitled Rapid Transit System, issued as U.S. Pat. No. 3,954,064, May 4, 1976. In said patents there is shown a high-speed ground transportation system comprising a vacuum tube which arcs downwardly deep underground between two stations, a vehicle suspended in the tube by a frictionless magnet suspension system and propelled by gravity so that trips between stations are made with essentially no expenditure of energy. An object of this invention is to provide a more efficient suspension system, to provide a self-aligning vacuum tube between adjacent stations and to provide a safer vehicle design.

As pointed out in my aforementioned U.S. patents the increasing cost of fuel makes it desirable to provide a high speed ground transportation system that requires a minimum amount of energy expenditure. Most prior art systems expend vast quantities of energy which cannot be reduced below certain values because of fundamental laws of physics.

There are two basic reasons for energy expenditure: inefficiencies in the propulsion system and drag. All propulsion systems using internal combustion engines waste a great deal of energy which can not be significantly improved because of the second law of thermodynamics. Although electric motors do offer very high efficiency vehicle propulsion, the problem of supplying the required input electrical energy can become extremely difficult at high operating speeds. For example, efficient power pick-up from an electrified "third-rail" at speeds above 300 mph will be almost impossible. On-board energy storage systems such as batteries or fly-wheels will quickly run down at high speed operation and will require frequent recharging. More exotic propulsive systems such as pneumatic propulsion also lose substantial energy because of the second law of thermodynamics. The energy here is lost through the change in gas enthalpy during the expansion-compression process that is inherent with pneumatic propulsion. This loss can not be reduced below certain levels because the gas volume will be large.

Drag is another major reason for energy expenditure and is inherent in all prior art high speed transportation systems. Drag can be broken down into two main sources: aerodynamic drag and suspension drag. Although aerodynamic drag can be eliminated by enclosing the vehicle inside a vacuum tube, the drag generated by the suspension system can become very large. For speeds above 200 mph a non-contacting suspension system is absolutely essential. All known non-contacting suspension systems that can operate in a vacuum are based on magnetic forces. Unfortunately, many of these systems generate substantial drag forces known as "magnetic drag" that can be much higher than the drag forces inherent in steel wheel/rail contacting suspension systems. (One might conclude that magnetic suspension systems have little or no drag because they are non-contacting but this is not the case.)

In order to provide a low energy consuming transportation system, the system must have high efficiency regenerative propulsion and low overall drag. The gravity propelled system described in this invention and in my aforementioned U.S. Patents will provide such a system. The high efficiency regenerative propulsion is obtained by providing a sloping guideway tube between adjacent stations and allowing the vehicle to coast from one station to the next by transforming its gravitational potential energy into kinetic energy and back into gravitational potential energy. By providing a frictionless suspension system and evacuating the tube's interior, this transformation will be 100% efficient, i.e., the regenerative propulsion will be 100% efficient and there will be no energy expenditure.

One of the most important prerequisites for the construction of a gravity propelled high speed transportation system that consumes nearly zero energy will be the construction of a non-contacting suspension system that consumes no energy, that provides high stability and that will generate essentially zero drag at all operating speeds. Such a system does not exist in the prior art. Thus, one of the major objects of this invention is to provide such a system.

Consider a long rail constructed from blocks of permanent magnets with north poles facing vertically upward. If a similar, but shorter rail is aligned over the longer one with north poles facing downward, forces of repulsion will be generated. For some magnets, with sufficiently strong field strength such as barium ferrite magnets, the forces of repulsion will be sufficiently strong to keep the top rail levitated above the lower one. Setting aside the problem of stability, if the top rail is moved along the bottom rail, the motion will generate absolutely no drag forces whatsoever. This can be proved by applying the principles of electromagnetic theory which are too involved to present here. The analysis has been done however and can be found in a technical paper by R. Borcherts entitled "Mathematical Analysis of Permanent Magnet Suspension Systems", *Journal of Applied Physics,* Vol. 42, No. 4, Mar. 15, 1971, pp. 1528–1529. Although the levitating capabilities of rails of permanent magnets have been long recognized as a means for providing suspension systems for transportation vehicles (see Polgreen's article "Rail-Ways With a Magnetic Suspension", *The Engineer,* Oct. 25, 1968, pp. 632–636), their frictionless characteristics have not been fully utilized. Drag is usually introduced into these systems by the guidance systems that are required for rail alignment. Unfortunately, permanent magnet suspension systems are very unstable. Usually, these systems employ guide rollers that contact the vertical faces of guide rails. At speeds above 300 mph these rollers become unstable and can create significant vibration and bearing drag. The other method, which has been proposed for maintaining proper alignment, uses controlled electromagnets that act laterally on vertical faces of ferromagnetic rails. But these systems will generate substantial magnetic drag that increases with increasing speed which can become very great. In addition, these lateral guidance systems are inherent consumers of energy. The preferred suspension system provided in this invention will be based on utilizing drag-free permanent magnets for both levitation and lateral guidance so that the complete suspension system will be non-contacting, self-stabilizing, non-energy consuming and entirely drag-free at all operating speeds.

One important feature of the present invention provides a sloping, self-aligning, evacuated tube guide-way between adjacent stations that is ideally suited for high-speed gravity propelled vehicles. This will be accomplished by suspending the tube inside a deep underground tunnel at two anchor points near each station similar to the main suspension cables of a suspension bridge.

Each transit vehicle is divided into pressure tight sections so that if atmospheric pressure is falling in one section due to a puncture through its pressure hull, it will be possible for the passengers to evacuate it by moving to adjacent sections without pressurizing the vacuum tube or without requiring the use of any emergency rescue vehicle. The damaged vehicle would continue its journey toward the next station without any other disruption.

Other features of the present invention are disclosed hereinafter.

BRIEF SUMMARY OF THE INVENTION

Thus, in the practice of this invention according to a presently preferred embodiment there is provided a vehicle, typically comprising a train of detachably coupled cars, supported inside an evacuated tube guideway by a frictionless, non-energy consuming, self-stabilizing suspension system utilizing repulsive magnetic forces from permanent magnets so that the motion is essentially drag-free at all operating speeds and expends essentially zero energy. The tubes between adjacent stations are suspended inside deep underground tunnels at anchor points near the stations so as to form smooth, self-aligning, catenary curves similar to the main suspension cables of a suspension bridge. Acceleration leaving one station and deceleration approaching the next station at the same elevation is achieved by allowing the vehicle to coast down the descending arc, where it is accelerated by gravity, and by coasting up the ascending arc where it is decelerated by gravity. Thus, the trip is accomplished by transforming the vehicle's gravitational potential energy at one station (relative to the tube's deepest point) into vehicle kinetic energy, and back into gravitational potential energy at the next station according to the principle of conservation of energy. Hence, essentially no energy is required or expended during the trip.

In case two adjacent stations are at different elevations, the resulting excess or deficiency in kinetic energy that arises from coasting between the adjacent stations is absorbed or supplied by an on-board, high efficiency, regenerative linear induction motor, that provides regenerative dynamic braking or supplementary propulsion. This regenerative linear motor draws and returns electrical energy from an on-board high efficiency flywheel kinetic energy storage system. Hence, if the energy conversion efficiencies are high, the difference in the vehicle's gravitational potential energy at the two stations is essentially equal to the different amounts of inertial energy stored in the flywheel energy storage system when the vehicle is at rest at each of the stations. The vehicle's total energy (potential, kinetic and flywheel) remains essentially constant and no energy is required or expended even when moving between stations having different elevations.

When the station separation distance is relatively large (i.e., 50 km or more) the deepest part of the vacuum tube will be horizontal. The speed will be increased along this section by converting flywheel inertial energy into vehicle kinetic energy by energizing the linear motors. When approaching the ascending arc, this additional energy is recovered by regenerative braking and fed back into the flywheel energy storage system with little loss.

The entire tube system is vacuum sealed. Passenger and cargo transfer between the vehicle's interior and station is made without removing the vacuum environment of the vehicle. This is accomplished by providing a system of air-locks through the tube walls at the station. These air-locks comprise the vehicle's relatively small, equally spaced pressure doors and similar equally spaced pressure doors in the tube walls at the station. When the vehicle arrives, it is stopped at a certain position so that all its pressure doors are opposite pressure doors in the tube. The connection is made by relatively small retractable flanges that surround and extend outward from the tube doors to engage air-tight slots around the vehicle's pressure doors. The volume of the resulting air-locks is very small so that they can be pressurized or evacuated in a relatively short time interval. Hence, the vehicle is able to stop at a station, transfer passengers and depart in a relatively short time without breaking the vacuum environment of any part of the tube and thus avoiding the necessity for operating large, powerful and energy consuming vacuum pumps.

The vehicle is divided into pressure tight sections that are separated from each other by on-board air-locks. If atmospheric pressure is falling in one section, due to a puncture in the vehicle's pressure hull, the passengers in that section can transfer to adjacent sections through the vehicle's on-board air-locks without having to pressurize the vacuum tube or without requiring the use of any emergency rescue vehicle. The punctured vehicle would continue its journey to the next station without any other disruption or change in schedule.

Since low drag vehicle operation is an important aspect for the present invention, it is useful to note what degree of vacuum is required throughout the tube system to result in negligible atmospheric drag at all anticipated vehicle speeds. Although a perfect vacuum would result in zero atmospheric drag it would be almost impossible to achieve. However, it is possible to operate the vehicle in a vacuum environment far from perfect and still achieve vehicle performance very close to the perfect vacuum situation. As pointed out hereinafter, the vacuum in the tube is at a $10^{-3}$ torr level, and as described in my above cited U.S. Pat. No. 3,954,064, on page 14, lines 23 to 45, it was shown that a vacuum of $10^{-3}$ torr generates an atmospheric drag of only 2.9 ounces on a vehicle (with semi-circular frontal cross-sectional area of 10.62 meters$^2$) moving at 140 meters/sec (313 mph) and only 2.3 lbs when moving at 500 meters/sec (1,118 mph). This drag corresponds to a power loss of only 0.15 HP and 6.86 HP, respectively. This loss is almost imperceptible and can be made up by the vehicle's small auxiliary propulsion system used for starting and stopping at each station. For example, suppose that two adjacent stations have the same elevation and are separated by 15 km. Then, if the aerodynamic drag (and suspension drag) were actually zero, a gravity propelled vehicle that leaves one station and begins to coast down the descending reach at 10 meters/sec (22.37 mph) would coast to the top of the ascending reach and approach the other station at exactly 10 meters/sec. The maximum speed would be about 394 mph at the deepest point, 4,431 feet, and the trip time would be about 2.4 minutes. Now, if the tube air-pressure is $10^{-3}$ torr rather than zero and if the total vehicle mass were 20,000 Kg, then the vehicle would arrive at the top of the ascending reach and approach the station not at 10 meters/sec but at 9.95 meters/sec (22.26 mph)—a loss of only 0.11 mph. The total relative energy loss would be less than 0.005% or 0.0044 Kw-hr. Assuming a cost of electric power at 2 cents/KW-hr, this represents a loss of only about 0.008 cents. Clearly, the effect of this aerodynamic drag induced by a tube residual air pressure of $10^{-3}$ torr is, for all practical purposes, indistinguishable from the ideal, zero drag case. Thus, the tube's residual air pressure need never go below $10^{-3}$ torr. Even if the tube pressure were one or two orders of magnitude above this level, drag is low. For example, at $10^{-2}$ torr, the aerodynamic power loss at 313 mph would be only 1.5 HP and at $10^{-1}$ torr it would be only 15 HP. In the art of vacuum technology, a vacuum of $10^{-3}$ torr is considered a medium vacuum. For a good discussion of vacuum environments see the article entitled "Vacuum Pump" from *Encyclopedia of Science and Technology*, Vol. 14, pp. 274-276 (McGraw-Hill Publishing Company, 1977).

Since the guideway tube is evacuated, there are no aerodynamic forces or buffeting on the vehicle as it moves between stations at high speeds. This permits very close vehicle/tube clearance resulting in greater tunnel utilization and lower tunneling costs. An economical split-level vacuum tube is provided in one embodiment of this invention to allow two vehicles to move simultaneously in opposite directions in the same tube section.

As pointed out and demonstrated in my aforementioned U.S. Pat. No. 3,954,064, this gravity propelled system will—because of fundamental laws of physics concerning the acceleration forces experienced by passengers—be able to transport passengers from one station to another station with separation distances between approximately 2 km to 50 km (which covers essentially all possible urban situations) faster than all other possible systems that operate on essentially horizontal planes (surface or subsurface) and that do not require the passengers to be restrained to their seats by seat belts. This includes advanced systems such as jet propelled tracted air-cushion vehicles, jet propelled magnetically levitated vehicles, or any other type of mechanically propelled vehicle that may be invented in the future. Thus, the present invention will not only outperform all other possible urban transportation systems that operate on essentially horizontal planes no matter how advanced they may be but it will offer this performance without expending essentially any energy. Thus, the present invention represents, for the first time in the history of ground transportation, a high speed urban transportation system that could never be outperformed or become obsolete.

DRAWINGS

These and other features and advantages of the present invention will be appreciated as the same becomes understood by refernce to the following detailed description of a presently preferred embodiment when considered in connection with the accompanying drawings wherein:

FIG. 8 is a schematic vertical longitudinal cross-section of the underground vacuum tube guideway suspended inside the underground tunnel connecting two adjacent stations $S_1$ and $S_2$ at equal elevations;

FIG. 13 is a schematic perspective view of the split-level vacuum tube guideway design showing an upper lever car and a lower level car;

FIG. 15 is a vertical cross-section of a grooved guide wheel and flanged guide rail.

FIG. 16 is a transverse cross-section of the station-car, air-lock system taken along line A—A of FIG. 14;

FIG. 18 is a transverse cross-section of the system of connecting rods that retracts, extends and bolts the air-lock flange to the vehicle's pressure hull;

FIG. 19 is a longitudinal vertical cross-section illustrating the air-tight car coupling system and the air-lock car escape chamber between coupled cars;

FIG. 20 is a transverse vertical cross-section illustrating the pressure tight bulkhead near each end of the car that forms one wall of the on-board, air-lock chamber between every pair of coupled cars;

FIG. 24 is a longitudinal vertical cross-section of the car's emergency escape air-lock system and FIG. 25 is a vertical longitudinal cross section of a representative underground tube path having two sloping reaches separated by an essentially straight and horizontal reach at the maximum depth.

DESCRIPTION OF THE PREFERRED EMBODIMENT

Figure 1:
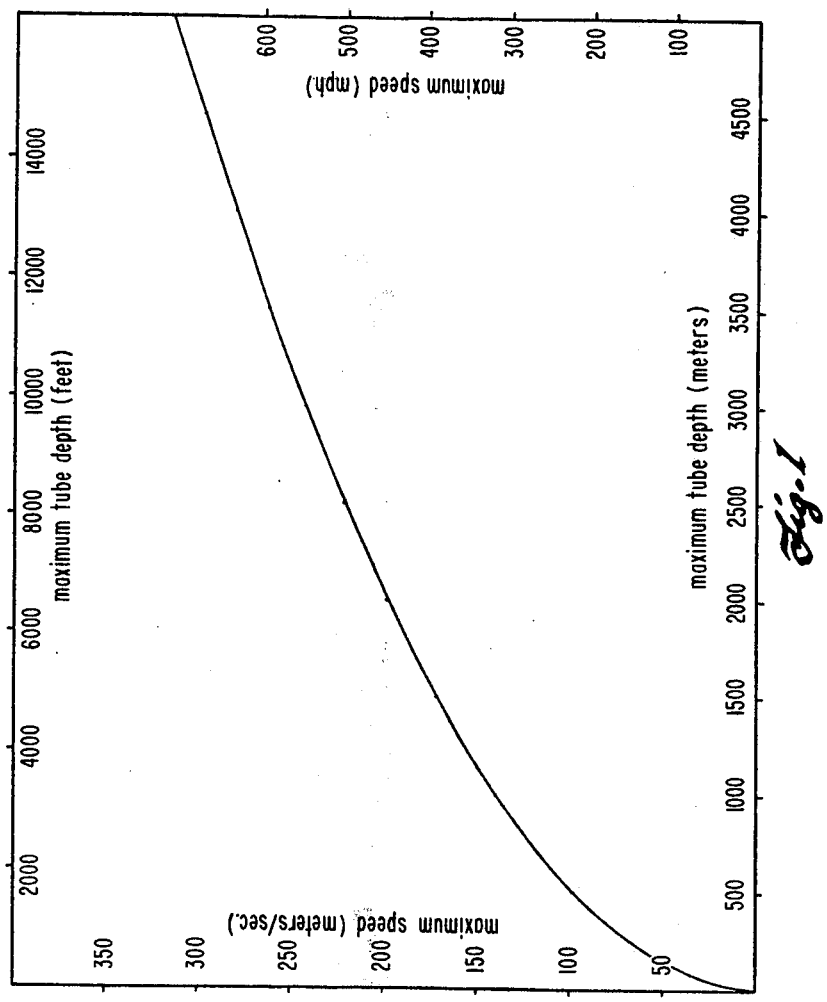
FIG. 1 is a graph of maximum speed versus maximum tube depth for gravity-propelled vehicles.

A basic feature of this invention (and in my aforementioned U.S. Pat. Nos. 3,954,064 and 4,075,948) is the utilization of gravity to propel vehicles from one point to another. This is accomplished by providing the vehicles with a frictionless magnetic levitation system and allowing them to move frictionlessly inside a sloping vacuum tube by converting their gravitational potential energy, relative to the gravitational equi-potential surface passing through the tube's deepest point, into kinetic energy and back into potential energy. Thus, when travelling between stations having equal elevation, no propulsive energy is required or expended. Moreover, the passengers in a gravity propelled vehicle experience absolutely no translational accelerations (forward or backward accelerations) relative to the vehicle's interior. They experience only slight downward and upward accelerations perpendicular to the vehicle's floor equivalent to riding in an ordinary elevator regardless of the vehicle's attitude. These two fundamental characteristics enable this system to outperform all prior art horizontal (surface or subsurface) transit systems and probably all future horizontal transit systems for urban areas. These profound aspects of the gravity propelled rapid transit system are demonstrated herein.

Before going into the construction details of the present invention it is useful to analyze the underlying physical principles on which it is based and how these principles are utilized to provide a high efficiency, high performance ground transportation system.

The vehicles in this invention will operate, for the first time, close to the principle of conservation of energy. In mathematical terms, this means that the vehicle's gravitational potential energy $E_p$, plus its stored onboard energy $E_s$ (the inertial energy stored in its flywheel), plus the vehicle's kinetic energy $E_k$, is very nearly equal to a constant E which represents the vehicle's total energy. This can be expressed by the equation $$E_p + E_s + E_k = E \quad (1)$$

Since $E_k = \frac{1}{2}mV^2$ and $E_p = mgh$, where m, V and h denote the vehicle's mass, speed and height above the maximum tube depth respectively, at any point along the tube connecting the two stations, equation (1) can be expressed as $$mgh + E_s + \frac{1}{2}mV^2 = E \quad (2)$$

where $g = 9.8$ meters/sec$^2$ denotes the earth's gravitational constant. Thus, the vehicles in this system will operate by converting their gravitational potential energy and stored flywheel inertial energy into vehicle kinetic energy and vice versa with very little energy lost during the conversion processes. This system differs fundamentally from other prior art systems in that the net energy lost during the conversion processes is not the result of basic physical laws such as the second law of thermodynamics or the laws of electrical resistance which require the loss of a finite percentage of the energy which cannot be violated, but losses that in principle can be made very small without reducing performance.

Suppose that the vehicle travels between stations $S_1$ and $S_2$ where the elevations above the maximum tube depth connecting the stations are denoted by $h_1$ and $h_2$, respectively. Hence, in view of equation (2) it follows that when the vehicle is at rest at the two stations $$mgh_1 + E_{s1} = mgh_2 + E_{s2}$$

where $E_{s1}$ and $E_{s2}$ denote the vehicle's stored on-board flywheel inertial energy when it is stopped at stations $S_1$ and $S_2$, respectively. Hence, the difference in gravitational potential energy at the two stations is equal to the difference in the vehicle's stored flywheel energy $$mgh_2 - mgh_1 = E_{s1} - E_{s2} \quad (3)$$

Notice that if $h_1 = h_2$, then $E_{s1} = E_{s2}$ and the trip can be made without using any stored flywheel energy. In this case equation (2) can be expressed as $$mgh + \frac{1}{2}mV^2 = mgh_0$$

where $h_0 = h_1 = h_2$. Hence, the vehicle's coasting speed (which will be called gravitational speed) at any point between the two stations can be expressed by $$V = \sqrt{2gy} \quad (4)$$

where $y = h_0 - h$ denotes the vertical depth below the station's gravitational equipotential surface. (The gravitational equipotential surface passing through any point is a spherical surface passing through the point with radius equal to the distance between the earth's center and the point. Locally, it can be viewed as a horizontal plane passing through the point.) A graph of equation (4) is given in FIG. 1. This graph clearly demonstrates the enormous speed capabilities of the present invention when tubes descending several thousand meters are utilized. For example, at a depth of 2,000 meters (6,562 feet), the vehicle's gravitational speed will be 198 meters/sec (443 mph).

One of the most important aspects of the gravity propelled transit system disclosed herein concerns the shape of the tube path between adjacent stations. Of course, they must all slope downward towards the next station and lie essentially in the vertical plane determined by the adjacent stations. They must also be smooth with a slowly changing radius of curvature because of the very high speeds involved. Although there are an infinite number of possible curves such as circular arcs, elliptical arcs, cycloid arcs, etc. that could be utilized, there is one curve which will be shown to be particularly adopted to gravity propelled transportation systems. This curve is called a catenary. It is the curve traced out by a freely hanging cable suspended between two end points.

The typical operating speeds of the gravity propelled system will be 300 to 600 mph. It is obvious that at these speeds the vacuum tube guideway will have to be aligned according to its smooth calculated path with extreme precision. But if this alignment can only be maintained by constant adjustments, performed manually by teams of maintenance workers, the cost will be extremely high and the total system will become uneconomical. The problem here is not in the alignment of the guideway system within the tube. Once it is installed inside the vacuum tube and accurately aligned on its support structure, there will be little need for future adjustments. But slight movements in the earth's crust are frequent occurances in some regions. If such a movement causes the tube to shift only 2 cm (0.79 inches) out of alignment from its design curve at a particular location, the system will have to be shut down until the section is realigned. The probability of this happening at some point of the tube between two stations may be fairly high in some regions. Therefore, one goal of the present invention is to solve this problem by providing a self-aligning vacuum tube. This will be accomplished by freely suspending the vacuum tube inside a deep underground tunnel between adjacent stations from two anchor points near each station. Thus, the tunnel and tube inside it will have catenary paths similar to the main suspension cables of a suspension bridge. If the earth shifts, the catenary shape of the tube will still be maintained because there will be ample room for the tube to move and adjust itself in all directions inside the tunnel. The construction details of this tube design will be considered later.

All prior art high speed ground transportation systems are equipped with powerful mechanical propulsion systems such as electric motors, turbines, Diesel engines, internal combustion engines, magnetic propulsion engines, jet engines, pneumatic propulsion engines and the like. They are also equipped with powerful mechanical braking systems. All of these mechanical systems exert translational acceleration and deceleration forces on the passengers parallel to the vehicle's floor that are directed backward on the passengers when the vehicle is being accelerated and directed forward on the passengers when the vehicle is being decelerated. When the station-to-station separation distances are relatively short, such as in urban areas, it is inconvienent to require the passengers to wear seat belts. During hours of peak passenger traffic there may be many more passengers wishing to ride in the vehicle than the number of available seats. Hence, many of the passengers may have to remain standing. Consequently, in these urban situations the vehicle's translational accelerations and decelerations will have to be below certain upper bounds in order not to throw the passengers off balance or out of their seats. According to extensive studies on high speed ground transportation systems, this maximum tolerable translational acceleration and deceleration was determined to be about 0.15 g (1.47 meters/sec$^2$). See, "A Parametric Model of High Speed Ground Transportation", *Transportation Research*, Vol. 3, pp. 317-331, 1969, by G. Hoffman. This means that in all prior art and future transportation vehicles that move in essentially horizontal planes (as in all surface and ordinary subway systems), the nominal transit time between two stations can never be reduced below certain minimum values without introducing seat belts, no matter how advanced the system may be. For example, the minimum possible transit time between two stations separated by 20 km (12.43 miles) that could be achieved without exceeding the 0.15 g acceleration (or deceleration) constraint is 233.3 sec (3.89 min). The vehicle would accelerate at the maximum 0.15g until it reaches the half way point (10 km) where it would be moving at 171.46 meters/sec (383.55 mph) and then apply its brakes smoothly to decelerate uniformly at the 0.15 g maximum level until it stops at the next station. This minimum transit time could never be reduced by more advanced propulsion systems without exceeding the maximum acceleration and deceleration constraint of 0.15 g.

One of the most important and far reaching characteristics of the gravity propelled transportation system as described in this invention is the fact that all of the discomforting translational accelerations and decelerations, common to all prior art and future horizontal systems (which limit their performance), completely vanish. The only accelerations and decelerations sensed by passengers in the present gravity propelled system are perpendicular to the vehicle's floor, regardless of its inclination, and therefore equivalent to a gentle ride in an ordinary elevator. By circumventing these translational accelerations and decelerations, it will be demonstrated that the gravity propelled vehicles will be able to significantly outperform all prior art and future high speed ground transportation vehicles that operate along essentially horizontal planes that do not require seat belts, and where the station separation distances do not exceed approximately 50 km (31 miles). These distances cover essentially all possible urban rapid transit systems and many intercity systems. These fundamentally important characteristics of the present gravity propelled transportation system will now be demonstrated.

Let $a_n$ denote the acceleration (or deceleration) sensed by the passengers at any point P along the vehicle's path. As pointed out above, the path between the anchor points will be a catenary. For simplicity we shall assume that the anchor points lie at the two stations and that P is a point on the catenary. Then $a_n$ can be expressed by $$a_n = g\cos\theta + (v^2/R) = g\cos\theta + (2gy/R) \tag{5}$$

where $\theta$ and R denote the path's inclination from the horizontal and radius of curvature respectively. The variable y denotes the depth below the station equipotential surface. (For a derivation of this formula see, *Principles of Mechanics*, McGraw-Hill Book Co., 1949, pp. 118-125, by J. Synge and B. Griffith.) The first and second terms on the right hand side of equation (5) correspond to the component of gravity acting normal to the path of motion and the centripetal acceleration due to motion along a curved path respectively.

Let $\theta_o$ denote the initial inclination of the catenary curve at the anchor points. For simplicity, we shall assume that the vehicle's velocity will be zero at the anchor points. (In actuality it will be relatively low.) Hence, in equation (5), y is the distance below the equipotential surface of the anchor points. Consequently $$(a_2)_{minimum} = g\cos\theta_o$$

$$(a_n)_{maximum} = g(2\sec\theta_o - 1) \tag{6}$$

The maximum depth d below the ends of the catenary is given by the formula $$d = D(\sec\theta_o - 1)/2\log(\tan\theta_o + \sec\theta_o) \tag{7}$$

where D denotes the separation distance between the anchor points. For definiteness, we shall choose $\theta_o = 20°$. Then, in view of (6), it follows that $(a_n)_{minimum} = 0.9397\ g$ $(a_n)_{maximum} = 1.1283\ g$ Since the normal acceleration force felt by passengers at rest is one g (i.e., the ordinary force of gravity), the actual deviations from the ordinary force of gravity sensed by the passengers corresponding to these extremes will be equal to $0.9397\ g - 1.0\ g = -0.0603\ g$ (minimum acceleration) and $1.1283\ g - 1.0\ g = +0.1283\ g$ (maximum acceleration). The $-0.0603\ g$ minimum acceleration is equivalent to the initial acceleration experienced in an elevator starting to move downward and the $+0.1283\ g$ maximum acceleration is equivalent to the acceleration experienced in an elevator starting to move upward. These are the only accelerations felt by the passengers. The mimimum $-0.0603$ g acceleration occurs when the vehicle leaves the first anchor point and the maximum $+0.1283$ g occurs when it passes through the deepest point in the tube. These values are well within the acceptable elevator acceleration standards. Thus, as far as the passengers can tell, the entire trip is equivalent to a gentle ride in an elevator that begins in a downward direction, proceeds down the vertical shaft, slows down and gently reverses direction (with no jerk) and comes back up to the original starting point. There is no sensation of any lateral motion. Consequently, no seat belts will be required and passengers can remain standing for short trips without ever being thrown about by translational accelerations that are inherent in prior-art transportation systems. Omitting the analysis, it can be shown that the trip time T (between the ends of the catenary) corresponding to $\theta_o = 20°$ is given by the formula $$T = 3.8098\sqrt{D/g} \qquad (8)$$

and the depth d in equation (7) becomes $$d = 0.09004D \qquad (9)$$

For example, suppose $D = 20,000$ meters (12.43 miles) and $\theta_o = 20°$. Then the trip time between the ends of the catenary will be 172.11 seconds (2.87 minutes). The maximum depth below the ends would be 1,800.8 meters (5,908 feet). The maximum speed at the maximum depth would be 187.9 m/sec (420.2 mph). The total accelerations experienced by the passengers will be a mild minimum acceleration of $-0.0603$ g and a mild maximum acceleration of $+0.1283$ g directed perpendicular to the floor of the vehicle without any translational acceleration whatsoever.

As a comparison, suppose that the stations were connected by a linear transportation system, i.e., a system where the guideway connecting the stations is a straight line. The minimum acceleration and deceleration that would have to be developed by a vehicle in such a system in order to match the same 172.11 second trip time is 0.2756 g and this acceleration is all translational. The vehicle would accelerate at 0.2756 g until reaching the half-way point at 10,000 meters (6.21 miles) when its speed would be 232.41 m/sec (519.88 mph). It would then have to begin decelerating immediately at 0.2756 g in order not to over-run the next station. The minimum 0.2756 g translational acceleration determined above for the linear system is 84% greater than the maximum tolerable acceleration of 0.15 g. This high translational acceleration and deceleration would topple over anyone standing in the vehicle's aisles or not restrained to their seats by seat belts. On the other hand, passengers riding in the applicant's frictionless vehicle with pure gravity propulsion will experience absolutely no forward or backward acceleration whatsoever.

In general, the minimum trip time required for a linear system is given by the formula $$T = 2\sqrt{D/a}$$

where a denotes the vehicle's acceleration (and deceleration). Hence, if we set T (gravity system) = T (linear system), it follows that the minimum required acceleration a for the linear system is given by $$a = 4D/T^2 = 0.2756g$$

and is independent of the station seperation distance D. When $a = 0.15\ g = $ maximum tolerable acceleration for the linear system, the corresponding minimum trip time is given by $$T(\text{linear}) = 5.16398\sqrt{D/g} = 1.3554 T(\text{gravity})$$

Hence, the minimum possible trip time for the linear system is at least 1.3554 times as long as the gravity propelled trip time regardless of station separation distance—or to put it another way, the trip time of the gravity propelled system will be at most only 0.7378 times the shortest possible trip time of the linear system. But in actuality, the trip time of the gravity propelled system will be significantly shorter than this 0.7378 fraction because the linear system will not operate to give minimum possible trip times as they would require constant acceleration to the half-way point and then constant braking deceleration all the way to the next station. The maximum vehicle speed would be much higher than in the gravity system. In addition, the linear system would not really be a linear system. It would in general require curves to avoid obstacles. This would make it impossible to accelerate a vehicle all the way to the half-way point where the required vehicle speed will be very high. But in the gravity propelled system, a vehicle would be continually accelerated up to the half-way point and then continually decelerated along the second half; and this acceleration and deceleration occurs automatically without the expenditure of any energy. Hence, we reach the rather remarkable conclusion that a gravity propelled transportation system will not only offer the fastest possible transportation for urban areas (where seat belts are not required), but it will also consume the least amount of energy. The following table describes the transit time T, maximum vehicle velocity $V_{max}$, average vehicle velocity $\overline{V}$ and maximum tube depth d for gravity propelled vehicles with various station-to-station separation distances D.

| Performance Characteristics of a Gravity Propelled Transit System $\Theta = 20°$ |||||||| 
|---|---|---|---|---|---|---|---|
| D || T | $V_{max}$ || $\overline{V}$ || d ||
| km | miles | minutes | m/sec | mph | m/sec | mph | meters | feet |
| 5 | 3.107 | 1.434 | 93.94 | 210.14 | 58.11 | 129.99 | 450.2 | 1,477.0 |

-continued

Performance Characteristics of a Gravity Propelled Transit System
$\Theta = 20°$

| D | | T | $V_{max}$ | | $\bar{V}$ | | d | |
|---|---|---|---|---|---|---|---|---|
| km | miles | minutes | m/sec | mph | m/sec | mph | meters | feet |
| 10 | 6.214 | 2.028 | 132.85 | 297.18 | 82.18 | 183.83 | 900.4 | 2,954.1 |
| 15 | 9.321 | 2.484 | 162.70 | 363.95 | 100.64 | 225.13 | 1,350.6 | 4,431.1 |
| 20 | 12.427 | 2.868 | 187.87 | 420.25 | 116.23 | 260.00 | 1,800.8 | 5,908.1 |
| 25 | 15.534 | 3.207 | 210.05 | 469.87 | 129.92 | 290.62 | 2,251.0 | 7,385.2 |
| 30 | 18.641 | 3.513 | 230.09 | 514.70 | 142.33 | 318.38 | 2,701.2 | 8,862.2 |
| 35 | 21.784 | 3.795 | 248.53 | 555.95 | 153.71 | 343.84 | 3,151.4 | 10,339.2 |
| 40 | 24.855 | 4.056 | 265.69 | 594.33 | 164.37 | 367.69 | 3,601.6 | 11,816.3 |
| 45 | 27.962 | 4.303 | 281.81 | 630.39 | 174.14 | 390.14 | 4,051.8 | 13,293.3 |
| 50 | 31.069 | 4.535 | 297.05 | 664.48 | 183.76 | 411.06 | 4,502.0 | 14,770.3 |

It is interesting to determine the shorest possible trip time $T_{min}$ that could be attained by gravity propelled vehicles traveling between two stations with separation distance D and the required tube path. Omitting the analysis, it can be shown that this minimum trip time path would be a cycloid with initial inclination $\theta_o = 90°$ and $$T_{min} = \sqrt{2\pi D/g}$$

The maximum depth d is given by $$d = D/\pi$$

and the normal acceleration $a_n$ felt by the passengers (perpendicular to the vehicle's floor) at any intermediate depth y where $0 = y = d$ is given by $$a_n = 2g\sqrt{y\pi/D}$$

Hence, $(a_n)_{minimum} = 0$ and $(a_n)_{maximum} = 2g$. Consequently, the differences between ordinary one g which are sensed as actual accelerations by the passengers will be $-g$ and $+g$. These accelerations are too high for practical applications.

Although the deep tunnel requirements of the gravity transportation system may seem difficult to realize, this is not the case. The earth is actually more suitable for tunneling at deeper depths in bedrock and it can proceed economically by modern high speed tunnel boring machines without fear of running into existing subway tunnels, sewage tunnels or utility tunnels. However, high rock temperatures at great depths may be an important factor in determining maximum tunnel depths. In general, rock temperature t is a linear function of depth d and can be expressed by the formula $$t = t_o + Kd$$

where $t_o$ denotes the average surface temperature and K denotes a constant depending on the underground geology at the particular location. (See Gutenberg's book, *Internal Constitution of the Earth*, Dover publications, Inc. 1951, pp. 107-149.) For example, areas in Grass Valley, Calif. have $K = 0.00908°$ C./meter and $t_o = 12.14°$ C. Hence, at a depth $d = 5,000$ meters (16,000 feet), $t = 57.5°$ C. (135.6° F.). However, in Greenwood, N.Y., $K = 0.03241°$ C./meter and $t_o = 4.29°$ C. At a depth of 5,000 meters, the rock temperature at this location would be 166.3° C. (331.4° F.).

The average underground temperature gradient for continental United States is approximately 54.9 meters/C.° which corresponds to $K = 0.01822°$ C./meter. Assuming a maximum allowable rock temperature of 60° C. (140° F.) with $t_o = 10°$ C. (50° F.) the maximum depth would be 2,744 meters (9,9003 feet). However, deep mines have penetrated to depths where rock temperatures exceed 60° C. by employing refrigeration equipment. (See, "Making Western Deep Levels the World's Deepest Mine", *Engineering and Mining Journal*, Feb. 1972, pp. 87-89.) Hence, on the average, tunnels for the gravity propelled system can be bored to depths of about 3,000 meters (9,842 feet). When $d = 3,000$ meters is substituted into equation (9), the corresponding station separation distance D is 33.319 km (20.703 miles). The vehicle's speed at this depth, which can be calculated by equation (4), would be 242.5 meters/sec (542.4 mph).

In the above descussion it is assumed that the two anchor points lie on the same equipotential surface (i.e., have the same elevation) and that the adjacent stations also have the same elevation. But this condition will be very difficult to meet in some cities where there are significant changes in ground elevation. But if there are differences in station elevation it will no longer be possible to convert the vehicle's potential energy leaving one station into kinetic energy and then convert all of this kinetic energy back into potential energy when arriving at the second station. An excess in kinetic energy will appear if the second station is at a lower elevation than the first and a difficiency in kinetic energy will appear if the second station is at a higher elevation than the first (which would make it impossible to coast all the way up to the second station). This situation is solved, however, by providing the vehicle with a high efficiency rechargeable energy storage system and coupling it to a high efficiency regenerative propulsion system. This energy storage system, which in the present embodiment is a flywheel system, becomes an energy depository where excess kinetic energy, while approaching a station at a lower elevation, can be recovered by regenerative braking and stored for later use, or where a deficiency in kinetic energy, while approaching a station at a higher elevation, can be made up by auxiliary propulsion drawing energy from the energy depository. Consequently, if the energy conversion efficiencies are very high, very little energy will be lost and the vehicle's motion can be described essentially by the principle of conservation of energy represented by equations (1) or (2).

The on-board energy depository is an important adjunct to the gravity propelled transportation system described in this invention because it removes the constraint of having to place all of the stations at the same elevation. However, in urban situations where station-to-station separation distances are less than about 50 km, the system will still be essentially completely gravity powered because the excess kinetic energy which would appear when traveling to a station at a lower elevation—which is actually excess gravitational potential energy—will be recovered and stored in the energy depository to be used later while traveling to a station at a higher elevation. The differences in gravitational potential energy between two stations at different elevations simply appears as equal differences in the amount of energy stored in the vehicle's on-board energy storage system at the two stations as shown in equation (3). Since each vehicle shuttles between all the stations in the system, they all return to the starting point where the energy depository contains the same amount of energy. It is interesting to point out the fact that if the system were not gravity powered and the vehicles moved frictionlessly through vaccum tubes lying on a horizontal plane and propelled by a 100% efficient regenerative propulsion engine, it would be powered by the on-board energy storage system and would also operate according to the principle of conservation of energy. But, as shown above, the performance of this system would always be limited by the translational acceleration and deceleration forces that would be exerted on its passengers. Consequently, a gravity propelled system will always be the fastest and most efficient high speed ground transportation system for urban areas where seat belts are not required.

Actually, gravitational potential energy can be viewed as stored energy in the vehicle that is converted to vehicle kinetic energy by the inclined guideway. This storage system or energy depository will have an energy density $E_p/m$ (vehicle potential energy divided by vehicle mass) given by the equation $$E_p/m = gh$$

where h is the distance above the maximum tube depth. If h=4,000 meters (13,123 feet), then $E_p/m = 39,200$ Joules/kg. The power density P/m of gravitational potential energy can be calculated by the equation $$P/m = VF/m = (2gy)^{\frac{1}{2}} mg \sin\theta / m = g(2gy)^{\frac{1}{2}}\sin\theta$$

where V, F and y denotes the vehicle's speed, gravitational force in the direction of motion and distance below the starting station respectively. The maximum power density at any depth occurs when $\theta = 90°$. The following table is a list of maximum energy densities and power densities of all of the rechargeable energy storage systems that have been previously proposed for transportation vehicles which was compiled by Lawson in his paper "Kinetic Energy Storage For Mass Transportation", *Mechanical Engineering*, Sept. 1974, pp. 36–42. The total energy and total power capacity of the various storage systems are determined by multiplying their energy densities and power densities by their masses. These masses are usually a small fraction of the vehicle mass. The characteristics of gravitational potential energy storage are added to the table for comparison purposes.

| Energy Storage System | Energy Density Joules/kg | Power Density Watts/kg | Deep Discharge Cyle Life |
|---|---|---|---|
| compression of gasses | 28,000 | $>10^4$ | $>10^7$ |
| hydraulic accumulator | 28,000 | $>10^4$ | $>10^7$ |
| elastic deformation | | | |
| steel spring | 320 | $>10^4$ | $>10^7$ |
| rubber band | 32,000 | 80 | 1,000–5,000 |
| electrochemical reaction | | | |
| lead-acid battery | 64,000 | 80 | 300–500 |
| nickel-cadminum battery | 110,000 | 80 | 1,000–3,000 |
| kinetic energy flywheel | | | |
| maraging steel | 200,000 | $>10^4$ | $>10^5$ |
| 4340 steel | 120,000 | $>10^4$ | $>10^5$ |
| gravitational | | | |
| 2,000 meter depth | 19,600 | 1,940 | $\omega$ |
| 4,000 meter depth | 39,200 | 2,744 | $\omega$ |

Notice that on a strictly quantitative basis, gravitational potential energy compares fairly well with conventional energy storage systems. But unlike all other energy storage systems, the total energy stored in this system is equal to its energy density multiplied by the total mass of the entire vehicle including the mass of all its passengers. Thus, when a person enters the gravity propelled vehicle, he literally brings his own propulsion energy with him—namely, his own body mass. A person traveling to a station with lower elevation will actually give more energy to the system than it uses to get him there. This extra energy is recovered by regenerative braking and put into the energy storage unit which is used later in giving extra energy to another person going to a station at a higher elevation.

One of the most important prerequisites for providing a gravity propelled transportation system based on the principle of conservation of energy as disclosed in this invention, is the construction of a non-energy consumming suspension system that is essentially frictionless and drag-free at all operating speeds. Atmospheric drag will be greatly reduced employing a vacuum tube guideway. The vacuum tube operation will, of course, introduce serious practical problems involving the safe and expeditious transfer of passengers between the vehicle and station but these problems will be considered and solved later.

The construction of a frictionless and drag-free suspension system as provided in this invention is based on utilizing magnetic repulsion forces between like poles of permanent magnets. A permanent magnet levitation system for railway trains utilizing low cost ceramic magnets has been studied in detail at the British Rail Research Center at Derby (see, "Permanent Magnets Attract Industry", *Electrical Review*, Oct. 10, 1969, pp. 534–537). In particular, a permanent magnetic rail, called a "Magnarail", was developed so as to give maximum lift at minimum cost. It comprises a 15.24 cm (6 inch) wide mild-steel "U-shaped" channel in which relatively inexpensive ceramic magnetic bricks of barium or strontium ferrite are laid end to end with, for example, the north poles facing up and extending slightly above the mild-steel channel. The height of the rails is 5.7 cm (2.25 inches). The vehicle is supported by another identical rail, but inverted so that the north poles are pointed down. These details are described in the aforementioned paper. In view of the small clearances between poles, the bricks are ground flat and parallel on pole faces to give a thickness tolerance of 0.05 to 0.1 mm (0.02 to 0.04 inches).

A "standard" ceramic Magnarail was developed by the British Rail Research Center with the following properties: length 9.14 meters (30 feet), height 5.7 cm (2.25 inches), total weight 340 kg (750 lbs) (two-thirds of which is ferrite), total lift capability with 0.95 cm (0.375 inches) between poles = 1,701.5 kg (3,751.8 lbs) or 186.1 kg/meter (125.1 lbs/foot). Hence, a pair of these Magnarails produce a total repulsive force of 3,403 kg (7,504 lbs) for the same pole gap.

Figure 2:
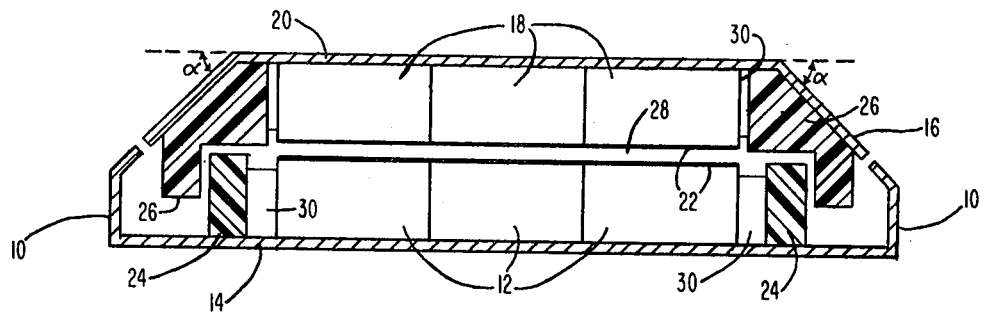
FIG. 2 is a transverse vertical cross-section of the frictionless, self-stabilizing permanent magnet vehicle suspension rail which is suspended over the permanent magnet guideway rail by magnetic repulsion forces.

Unfortunately, unless some form of lateral guidance is provided, the British Magnarails on the vehicle will float in an uncontrollable manner over the track Magnarails and quickly move to a position where the repulsive forces become attractive forces. In particular, if the vehicle Magnarails move to a position approximately 3.2 cm (1.25 inches) out of alignment on either side of the track Magnarails, the repulsive levitation will be completely lost. The British system maintained the proper alignment by providing guide rolls on-board the vehicle that move in horizontal planes on each side of a vertical guide rail along the track. The guide rollers are pressed firmly against this vertical guide rail and keep the vehicle in the proper alignment over the track Magnarails. However, this results in rolling friction that becomes severe at high speeds (e.g., 300 mph) due to vibration and other instabilities. The bearings heat, causing increasing friction and then more heat which can easily result in locked wheels. These problems are the same experienced in high speed wheel/rail systems. This limitation on speed, with the accompanying suspension drag, will be eliminated in the present invention by providing a self-stabilizing Magnarail. It will also be designed to give approximately three times as much lifting force as the British "standard" Magnarail and be completely frictionless. This magnarail system is an important aspect of the present invention. A transverse cross-section of this Magnarail is shown in FIG. 2. The track Magnarail 10 is constructed by laying three rows of ceramic ferrite brick magnets 12 end to end along a mild-steel channel 14 that bends inward from the vertical at the ends at an angle α of 45°. The vehicle Magnarail 16 is composed of similar rows of ceramic ferrite brick magnets 18 but laid in a channel of mild-steel 20 that bends outward from the vertical by an angle α of 45°. Both channels of mild-steel have a thickness of 0.635 cm (0.25 inches). The mild-steel around the sides of the magnet bricks essentially eliminates all leakage flux and gives lateral stability together with increased repulsive force. Each of the brick magnets has a cross section of 9.08 cm by 10.16 cm (2 inches by 4 inches). The track magnets 12 are laid with north poles facing up and the vehicle magnets 18 are laid with north poles facing down. The transverse width of the mild-steel track Magnarail 10 is 52.07 cm (20.5 inches). the transverse width of the mild-steel of the vehicle Magnarail 16 is 48.26 cm (19 inches) and is laid with its ends directly in line with the ends of the mild-steel of the track Magnarails 10. The mild-steel channels conduct the magnetic flux of the brick magnets of the track Magnarails 10 and vehicle Magnarails 16 and emerge at the ends with the same polarity. If the vehicle Magnarail 16 moves slightly to the right of the track Magnarail 10, the repulsive force between the ends of the mild-steel channel on the right side increases while the repulsive force on the left side decreases. This will result in an unbalanced lateral force that will tend to restore the vehicle Magnarail 16 to the equilibrium position directly over the track Magnarail 10. Consequently, the vehicle Magnarail 16 is self-stabilizing over the track Magnarail 10.

In order to protect the pole faces from possible contact damage, a thin layer of protective epoxy resin material 22 is applied to both track and vehicle Magnarails. (See, "Epoxy Resin Insulators for Overhead Lines", Electrical Review, June 15, 1973, ppg. 26–29.) The epoxy resin is an excellent non-conductor and hence will produce no eddy-currents and therefore no magnetic drag. The total lift force per unit length generated by the above Magnarails will be approximately three times that produced by the British "standard" Magnarails which comes to 558.3 kg/meter (375.3 lbs/foot) for a pole gap of 0.95 cm (0.375 inches).

Although the pole faces of the brick magnets 12, 18 are protected by a thin layer of epoxy resin 22, high strength Teflon stand-off skid rails 24,26 are mounted inside the track magnarails 10 and vehicle magnarails 16. These skid rails 24, 26 prevent the vehicle magnarails 16 from moving more than 0.635 cm (0.25 inch) out of lateral alignment from the track magnarails 10 and also prevents the gap 28 between the pole faces of the rail magnets 12 and vehicle magnets 18 from getting smaller than 0.635 cm. A suitable non-conducting filler material 30 such as plastic is added between the skid rails and brick magnets. This filler 30 helps keep the brick magnets fixed inside the mild-steel rails.

Figure 3:
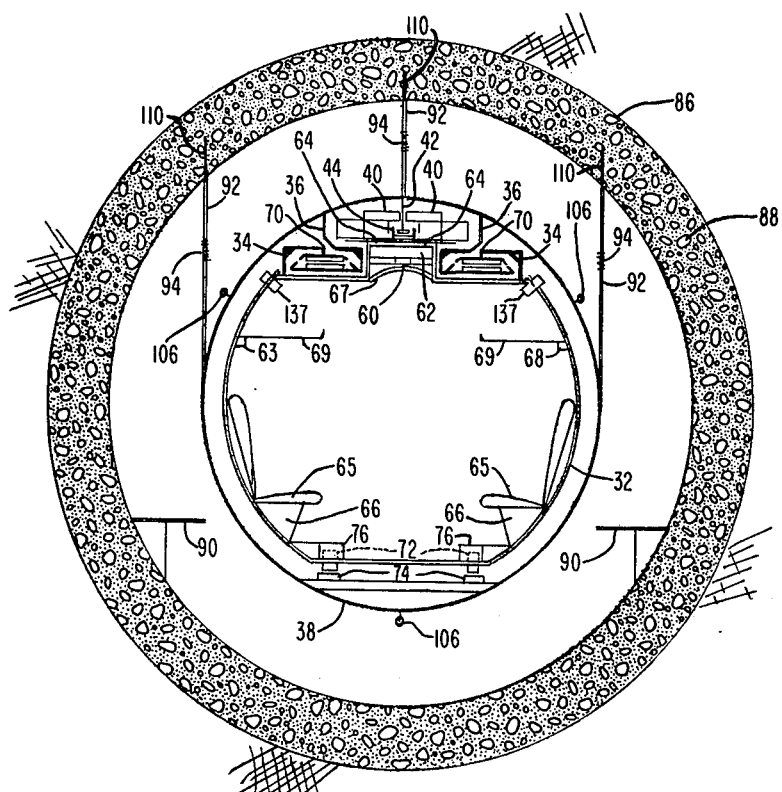
FIG. 3 is a transverse vertical cross-section of the magnetically suspended vehicle inside the vacuum tube which is suspended inside the tunnel.

In one embodiment shown in FIG. 3, the vehicles of this invention are suspended by two of the above described Magnarails 16. These Magnarails 16 are attached above the vehicle 32 on support structures 34 with one rail on each side and extend parallel to each other over the vehicle's entire length. Similar track Magnarails 10 are mounted on trusses 36 that extend into the vacuum tube 38 from the upper portions of each side. The combined lifting force of the two Magnarails is 1,117 kg/meter (750.7 lks/foot) with a pole-to-pole separation distance of 0.95 cm (0.375 inches). Unlike all other permanent magnet suspension systems, this system is self-centering, totally frictionless and drag-free at all operating speeds, and consumes no energy.

A double sided regenerative linear induction motor 40 is provided that straddles and reacts electromagnetically with a stationary reaction rail 42 mounted vertically in the tube's longitudinal mid-plane. A similar linear motor is discussed in detail by Dannan et al in a paper entitled "A Linear-Induction-Motor Propulsion System for High Speed Ground Vehicles", Proceedings of The IEEE, Vol. 61, No. 5, May 1973, pp 621–630. The motor discussed in this paper has an operational efficiency of 80.5% with a rail-armature (stator) gap of 1.58 cm (0.623 inches).

Figure 4:
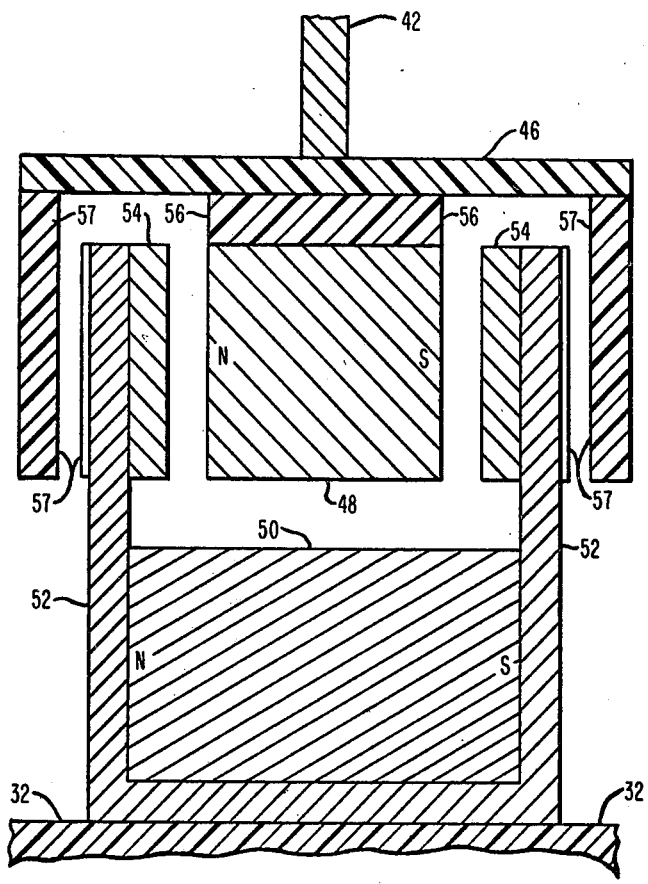
FIG. 4 is a transverse vertical cross-section of the frictionless permanent magnet linear motor lateral guidance system.

It is well known that the efficiency of linear motors can be significantly increased by decreasing the rail-armature gap. This decrease will be accomplished in the present system by providing an independent rail-armature lateral guidance system 44. As in the vehicle suspension system, this system 44 is also based on utilizing drag-free repulsive forces between like poles of permanent magnets. It is constructed by providing a guide rail 46 attached to the bottom of the reaction rail 42 composed of blocks of high coercivity permanent magnets 48 with north and south poles oriented perpendicular to the surface of the reaction rail 42. The details of this system are shown in FIG. 4. A similar row of high coercivity permanent magnet bricks 50 is mounted along a straight line segment on top of the vehicle 32 directly below the guide rail 46 with magnetic poles oriented parallel to the rail magnets 48. These magnets 50 are mounted inside a U-shaped mild-steel channel 52 that directs the magnetic flux of the magnets 50 upward to pole pieces 54 that form a horizontal gap. The rail of fixed brick magnets 48 fits into the gap between the pole pieces 54. The guidance magnets 48 stand away from their support structure 46 on a non-conducting platform 56 so that the magnets 48 are vertically centered between the pole faces 54. This lateral guidance system is strongly self-centering. If the vehicle moves too far to one side of the track's center-line, an unbalance force of repulsion develops in the pole gap between the pole pieces 54 that tends to keep the guide rail 52 centered at all times. Additional stand-off skids 57 are provided to prevent the pole faces of the guide rail brick magnets 48 from striking the pole pieces 54 of the vehicle guide rail 52. During the construction of the vacuum tube guideway 38, the alignment of the reaction rail 42, magnarail structure 36 and guide rail 48 is held to an accuracy of about 0.05 cm (0.02 inches).

Figure 5:
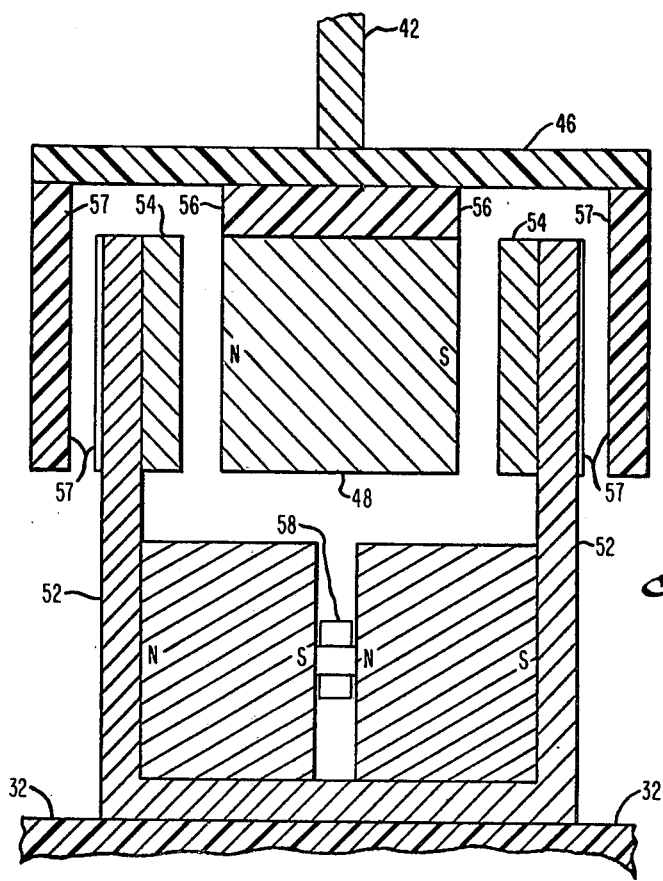
FIG. 5 is a transverse vertical cross-section of the vehicle's lateral oscillation damping system.

In order to prevent possible unwanted lateral oscillations from building up on the vehicle an independent electromagnetic damping system is provided. The components of the preferred embodiment for this system are shown in FIG. 5. Approximately 5% of the vehicle's self-centering lateral guidance magnets 50 are fitted with low power, servocontrolled electromagnets 58. Hence, the flux in these lateral guidance magnets 50 can be changed by applying a current to the electromagnets 58. The current to these electromagnets 58 is controlled by inertial sensors 60 (FIG. 3) on-board the vehicle 32 that sense small lateral oscillations. The sensors respond to these oscillations by directing current to the electromagnets 58 which dampen out the oscillations. The total power required to operate all of these damping electromagnets will be less than 100 watts. Notice that if all of the current is cut off from the electromagnets it becomes self-centering. This represents an important built in fail-safe feature of the lateral oscillation damping system. As in the suspension system, this lateral guidance system is drag-free at all operating speeds. This damping system, however, is optional.

Since the vehicle is already self-stabilizing in the lateral direction because of its self-stabilizing suspension system, the above lateral guidance system will enable the vehicle to maintain very accurate lateral alignment—e.g., to an accuracy of at least 0.3 cm (0.12 inches). Hence, the nominal rail-armature gap for the linear motor can be as small as 0.5 cm (0.2 inches) which will enable the over-all efficiency of the motor to be above 90% and perhaps even above 95%.

In the present embodiment the linear motor 40 is energized by relatively small, high efficiency flywheel kinetic energy storage units 62. These units are of the type disclosed by Post in his U.S. Pat. No. 3,683,216 entitled "Inertial Energy Storage Apparatus and System for Utilizing the Same", filed Feb. 24, 1971. As pointed out by Post, these inertial energy storage units will have an over-all, in-out electrical efficiency of over 95%. These energy storage units 62 will be interfaced with the linear motor/generator 40 by high efficiency solid state cycloconverters 64. These power conditioning units have operating efficiencies above 99%. The operating principles of cycloconverters are described in detail in an article by George Pinter entitled "The Cycloconverter Adjustable-Speed Drive", *Machine Design*, June 23, 1966. Hence, the entire linear motor/generator 40 and flywheel system will have an operating efficiency of about 85% to 90%. However, it should be emphasized that in urban areas where station-to-station separation distances are less than about 30 miles, the primary propulsion mode is gravity because according to the principles taught in this patent application, gravity propulsion will be 100% efficient and 100% regenerative. The linear motor will be used for absorbing or supplying excess kinetic energy that arises when the vehicle coasts between stations having different elevations or for boosting its speed.

The vehicles in the gravity propelled transit system are composed of two or more individual cars that are coupled together to form a train. The transverse cross-section of one car in a relatively small embodiment is shown in FIG. 3. Since the passengers do not experience any translational accelerations, the seats 65 are arranged in two rows that face each other on each side of the vehicle separated by a relatively wide aisle that is also used for standing room. Hence, the seated passengers face directions perpendicular to the direction of motion. In order to accommodate a large number of seated passengers, the seats are not partitioned with arm rests. Each car has a pressure hull with an outside diameter of 2.743 meters (9 feet) and inner diameter of 2.591 meters (8.5 feet). They are equipped with their own life support equipment and environmental control systems that include pressurized air tanks, air conditioners and circulators, temperature and humidity regulators, carbon dioxide removal systems, air purifiers, etc., with adequate reserve air to keep the car pressurized when it is punctured by relatively small holes. This equipment is stored in the space 66 beneath the seats 65 and in the space 67 above the aisle. Emergency oxygen masks are provided in storage areas 68 above the seats which automatically appear in the event of a serious loss of cabin pressure or a failure in the air purifying systems. Luggage racks 69 are provided above the seats. Each car in a train is connected to adjacent cars by flexible umbilical lines so that pressurized air and/or electric power can be supplied from neighboring cars if needed.

Figure 6:
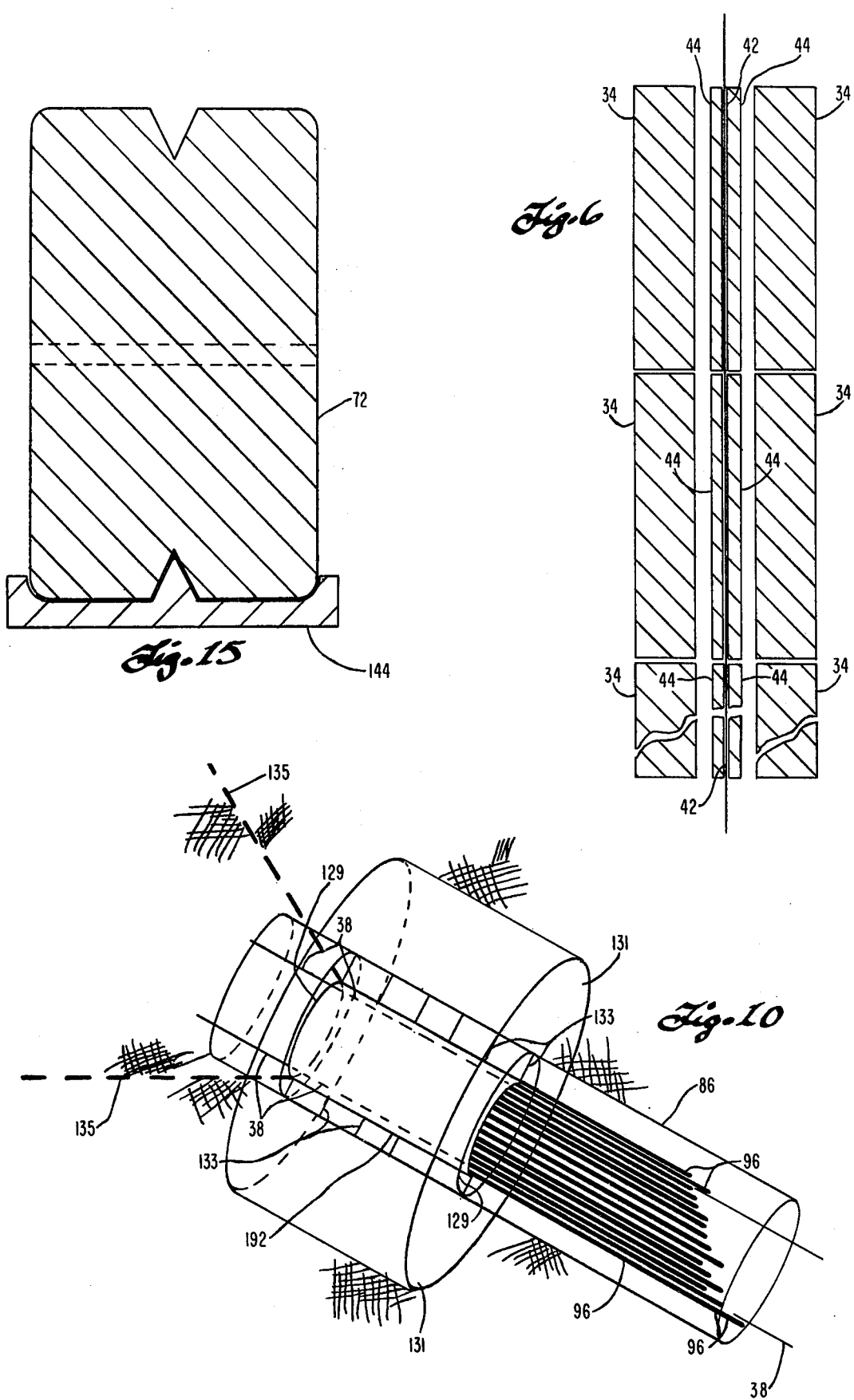
FIG. 6 is a transverse horizontal cross-section of the car's independent suspension system.
Figure 7:
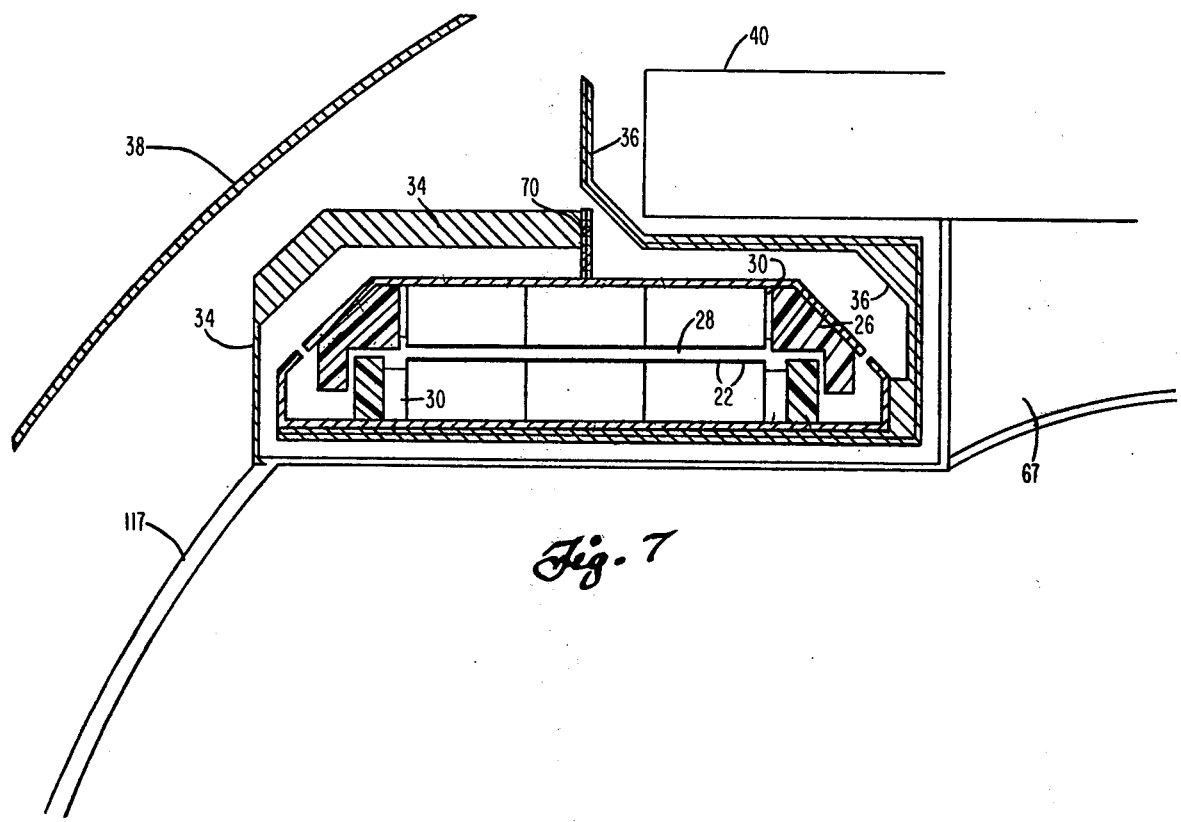
FIG. 7 is an enlarged section of FIG. 3 illustrating the vehicle's suspension system.

The car whose cross-section is shown in FIG. 3 is 15.16 meters long (49.74 feet). If the vehicle Magnarails 16 were straight sections 15.16 meters long it would be impossible to negotiate sharp curves in either vertical or horizontal planes and still maintain the required close alignment between the vehicle Magnarails 16 and track Magnarails 10. This problem will be solved by cutting the two vehicle Magnarails 16, lateral guidance Magnarail 52 and skid rails into 10 sections 3 meters long and providing each with its own vertical suspension springs 70. Thus, each of the ten magnarail sections forms an independent suspension system and will support a total mass of 1,674.9 kg at a pole gap of 0.98 cm (0.375 inches). They are separated longitudinally from each other by 4 cm (1.57 inches) and are free to pitch and yaw 1° relative to each other in both horizontal and vertical planes. The springs 70 also allow vertical displacements of 1.5 cm (0.59 inches). Collectively, these sections provide the car with an independent suspension system capable of supporting a total mass of 16,749 kg (36,925 lbs.) at a pole gap of 0.95 cm (0.375 inches) which allows the car to pass smoothly over relatively sharp curves in both vertical and horizontal planes while maintaining its levitating Magnarails properly aligned directly above the track Magnarails 10 with essentially constant separation distance. These suspension sections are shown in FIGS. 6 and 7.

The suspension system described above is frictionless, self-stabilizing and consumes essentially no energy. Since atmospheric drag is eliminated by providing a vacuum tube, the vehicles will move without any drag whatsoever. Consequently by utilizing vacuum tubes that slope downward between adjacent stations it will be possible to propel the vehicles by converting their gravitational potential energy into kinetic energy and back into gravitational potential energy without any perceptible loss. If two adjacent stations are at the same elevation, the vehicles will depart and arrive at equal speeds without using any auxiliary propulsion or braking beyond that required for starting and stopping (which will be negligible).

When the vehicle is stopped at a station or moving in the immediate vicinity of a station it is levitated by wheels 72 that contact rails 74 that are provided only in the immediate vicinity of the station (FIG. 3). These wheels 72 are relatively small, with a diameter of 16 cm (6.3 inches). They are driven by low power regenerative electric traction motors 76 which are used to start and stop the vehicle at each station. A suitable electric motor/generator is described in U.S. Pat. No. 3,639,792 filed Dec. 28, 1970 by Robert Anderson entitled "Motor-Generator". The sections of tube in the immediate vicinity of a station where the vehicle is levitated by its wheels 72 do not contain any track Magnarails 10 or reaction rail 42. Each end of the track section in the immediate vicinity of a station beings at a level 3 cm (1.18 inches) below the vehicle's nominal wheel level (when the vehicle is levitated by the Magnarails). The rails 74 gradually rise in height in the tube 38 so as to make smooth contact with the wheels 72 when the vehicle is approaching the station while still being levitated by the Magnarails. The rails 74 continue to gradually rise higher in the tube 38 after the initial wheel-rail contact so that the wheels gradually begin to support more of the vehicle's weight. Thus, the vehicle's levitation is gradually shifted from its Magnarails 16 to its wheel 72. When about 90% of the vehicle is supported by its wheels 72, the track Magnarail 10 and reaction rail 42 are no longer needed and are therefore terminated. The vehicle continues to coast toward the station but instead of being levitated by its Magnarails 16, it is levitated by its wheels 72. The vehicle is finally slowed to a complete stop at the station by regenerative braking that generates electrical energy that is returned to the flywheel energy storage system. This energy is used for starting the vehicle. After passenger transfer is completed, the vehicle is started by its wheel motor/generators that gradually speeds up the vehicle to about 5 m/sec (11.2 mph). A new section of track magnarail 10 (and reaction rail 42) begins in the tube 38 and the rails 74 gradually lower in height so that the vehicle settles smoothly on the track magnarails 10. The section of rails 74 in the vicinity of the station is terminated after the vehicle's weight is completely supported by the track magnarails 10. Notice that if all the stations in the system have the same elevation the linear motor 40, the reaction rail 42 along the tube, and the reaction rail lateral guidance system 44 will be unnecessary. Their removal will significantly reduce the installation cost of the gravity propelled transit system. It should also be noted that the rotary regenerative electric motors connected to the wheels will have a much higher operating efficiency then the linear motors.

The gravity propelled rapid transit system will also have the ability to perform switching at the intersection of two or more vacuum tubes. This will be accomplished when the vehicle is in the immediate vicinity of a station and levitated by its wheels 72 rolling on track rails 74 in the tube. These sections will be essentially level and the vehicle will be propelled at low speeds by its low power wheel motors 76. The switching system is similar to conventional wheel/rail switching systems for railway trains.

According to the present embodiment of this invention when two adjacent stations are relatively close to each other, for example, 2 km (1.24 miles) to 50 km (31.07 miles) that would cover most urban applications of the system, the vacuum tube will trace out a smooth continuous curve with slowly varying curvature with no horizontal reach at the maximum depth. Such a curve will eliminate any sudden jerk that would otherwise be experienced while moving rapidly over sections with rapidly changing curvature such as passing between straight sections and curved sections. FIG. 8 describes this path between two adjacent stations $S_1$ and $S_2$ located on the same gravitational equipotential surface 78. For the time being, we shall assume that all stations lie on the same equipotential surface 78 (i.e., they have the same elevations). The stations are located beneath the earth's surface 63.

It was pointed out above that the tube connecting $S_1$ and $S_2$ will be suspended inside a tunnel from two anchor points 80 near each station similar to the main suspension cables of a suspension bridge. Hence, the path 82 of the tube between the anchor points 80 will be a catenary. The catenary section 82 of the tube is connected to the stations $S_1$ and $S_2$ by smooth transition paths 84 that are horizontal at each station. A cross-section of the vacuum tube 38 and tunnel 86 is shown in FIG. 3.

If the tunnel is not bored in solid bedrock, a tunnel liner 88 may be required. The outside diameter of the vacuum tube 38 as shown in FIG. 3 is 3.048 meters (10 feet). The construction material of this tube will be either carbon fiber composites (see "Carbon Fiber Composites for Aerospace Structures". *Physics Bulletin* (British), Vol. 20, p. 444, 1969 by A. C. Ham) or high strength carbon steel depending upon economics. The tunnel liner 88 will be reinforced concrete. The inside diameter of the tunnel is 4.48 meters (14.72 feet). The distance between the walls of the vacuum tube 38 and tunnel 86 is 0.719 meters (2.36 feet). A catwalk 90 is provided on each side of the tube 38 for inspection and maintenance workers. This catwalk is 0.61 meters (2 feet) wide.

Figure 9:
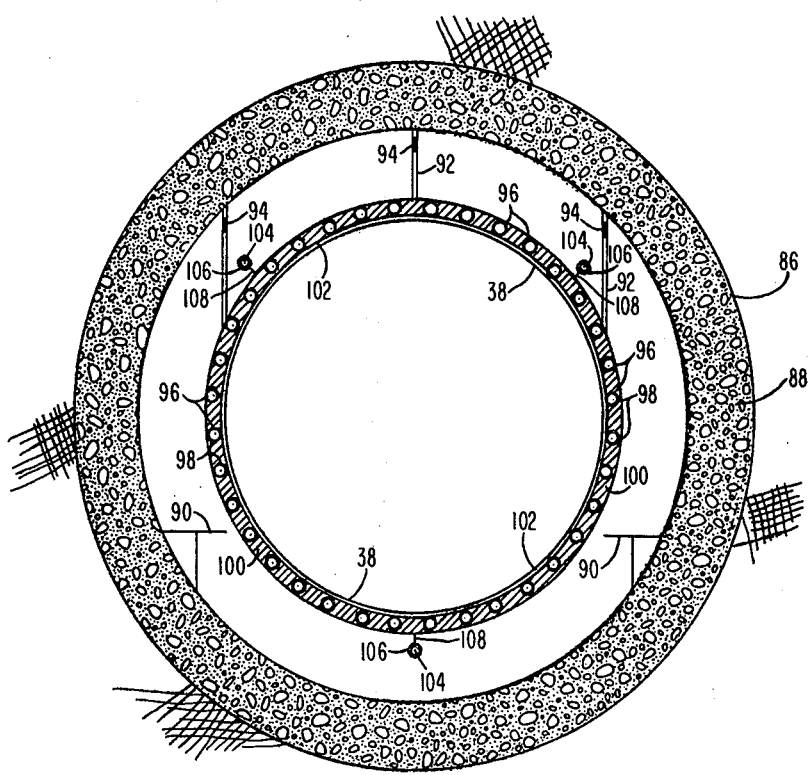
FIG. 9 is a transverse vertical cross-section of the vacuum tube guideway suspended inside the tunnel by main suspension cables and vertical support cables.

In order to reduce the tremendous tension forces that would ordinarily be required at the anchor points if the tube were suspended freely inside the tunnel 86 at the anchor points 80, and only at the anchor points, a system of relatively short vertical support cables 92, extending throughout the tunnel and spaced every 10 meters (32.8 feet) is provided. These cables 92 are made of 5 cm (2 inch) diameter wire rope (steel) and are fitted with stiff extendable, constant-tension springs 94 so that the tube 38 is free to move in all directions inside the tunnel 86 if the earth surrounding the tunnel 86 is displaced by movement in the earth's crust. Hence, the tube 38 will follow a smooth catenary path between the anchor points 80 even if the tunnel shifts its position relative to the anchor points due to movement in the earth's crust. This vacuum tube guideway design is an important feature of the present invention as it enables the guideway tube to be self-aligning between the anchor points where the vehicle will reach its highest speeds. A schematic longitudinal cross-section of the vacuum tube 38 suspended inside the tunnel 86 is shown in FIG. 8. Construction details showing how the vacuum tube 38 is suspended inside the tunnel 86 is shown in FIG. 9.

The tube 38 is surrounded by a network of main suspension cables 96 10.16 cm (4 inch) in diameter that run parallel to the tube and are anchored at the anchor points 80. These cables 96 pass through holes 98 in thick flanges 100 (spaced every 5 meters) which are in turn fastened to tubular sleeves 102 that act as stiffeners for the vacuum tube 38. There are 36 of these main 4 inch diameter suspension cables spaced equidistant from each other around the circumference of the tube 38 at 10° intervals. Each cable traces out a smooth catenary path between the anchor points. These cables 96 act as a cradle for the vacuum tube 38. Since these cables will be under extremely high tensile stress they will be constructed from multiple filaments of high strength fiber glass (e.g., fused silica, S-glass, E-glass). see, *The Physical Properties of Glass*, by D. G. Holloway, Wykeham Publications 1973 and "Lighter Than Aluminum Stronger Than Steel" by W. Von Braun, *Popular Science*, Feb. 1969. High strength steel cable could also be used if the distance between the anchor points is not too great (e.g., 15 km or less). The tube 38 itself is also put under relatively high longitudinal stress so that the total longitudinal stress is shared by the main suspension cables 96 and the vacuum tube 38. The force in each vertical support cable 92 is adjusted so that all stresses on all of the cables 96 and tube 38 are well within the material limitations so as to give a wide margin of safety.

Since the tube and main suspension cables 96 (which are in physical contact with the sleeves, which are in turn in physical contact with the tube 38) are under very high longitudinal stress, a vehicle passing any point inside the tube will not cause the tube to be deflected downward under the weight of the vehicle at that point even though the entire tube 38 and cables 96 are partly supported by spring loaded vertical support cables 92. Thus, the tube 38 is not only smooth and self-aligning under movements in the earth's crust between stations, but its shape is also uneffected by the weight of the vehicle when it passes through it. That is to say, the tube will not sag under the vehicle's weight at any point between the anchor points. The tube 38 is supported in the tunnel 86 by the overhead support cables 92 and other conventional supports on the bottom of the tunnel 86 in the immediately vicinity of each station (bounded by adjacent anchor points on each side of the station if there are more than two stations in the system). A station at the end of the line will obviously have only one anchor point.

Figure 10:
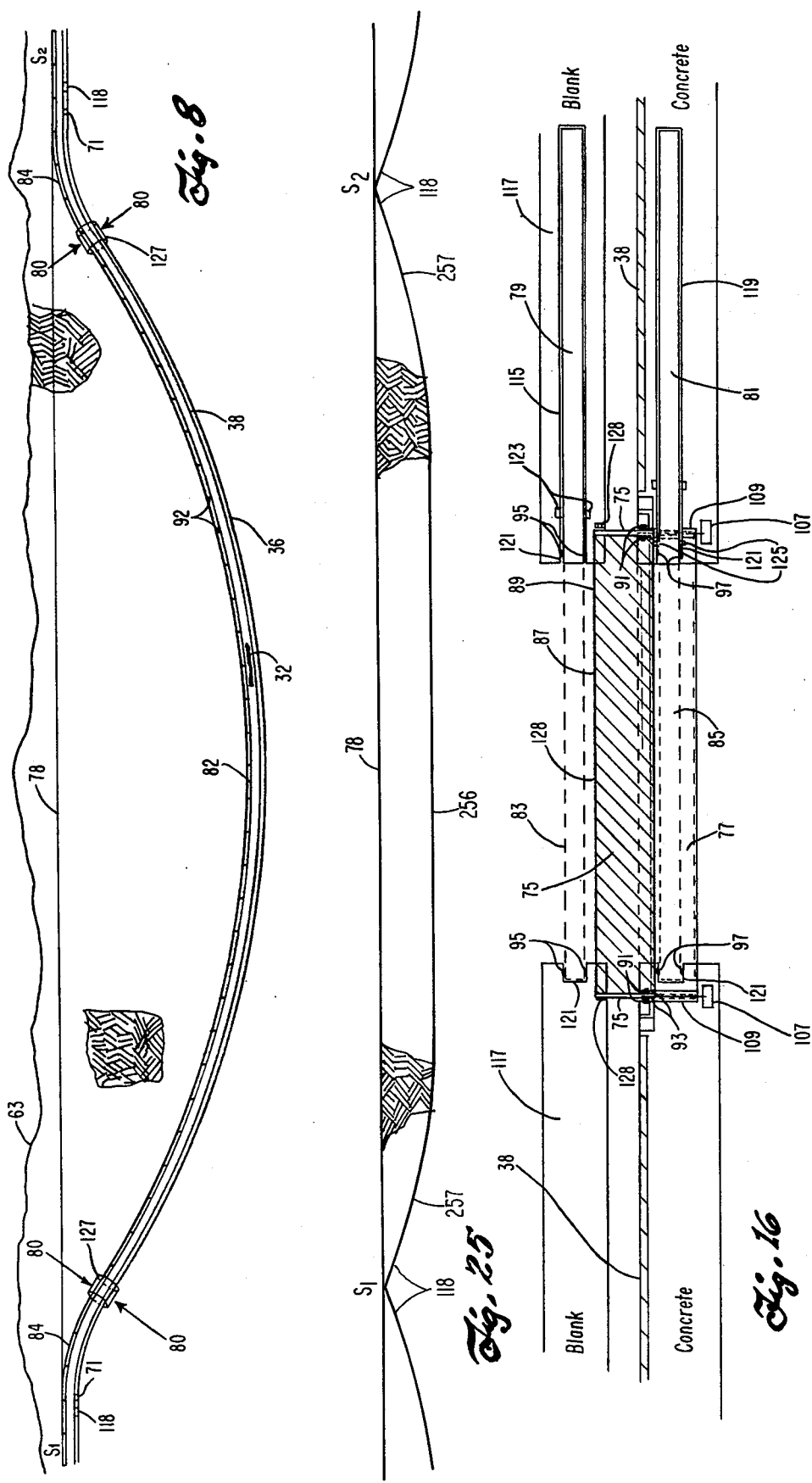
FIG. 10 is a schematic cutaway perspective view of a cable anchoring structure that anchors the tube's main suspension cables.

FIG. 10 is a schematic drawing describing how the main suspension cables 96 are anchored at the anchor structure 127. This structure consists of a 4 inch thick, 100 foot long steel sleeve 129 that is anchored to a surrounding concrete foundation 131 by a plurality of adjustable length steel stand-off rods 133 and anchor cables 135 driven deep into the surrounding earth. The main suspension cables 96 are anchored to the end of this sleeve.

Although this tube suspension system is self-aligning between the anchor points 80, large movements in the earth's crust may cause the supporting cables 92 to exert erroneous forces that will distort the true catenary path of the vacuum tube 38 between the anchor points 80. In order to detect this possibility, a high accuracy alignment sensor system is provided. Three cables 104, one centimeter in diameter, constructed from multiple filaments of fused silica glass fibers and surrounded by a thin jacket of conductor material such as aluminum are anchored at the anchor points 80 and allowed to hang freely by their ends, close to the vacuum tube 38. Notice that this cable will automatically form a true catenary path. Cables of fused silica glass fibers are extremely strong and could hang suspended in a catenary curve between two ends separated by more than 100 km (62.1 miles). The cables 104 pass through a system of conducting rings 106 attached to the flanges 100 by stand off rods 108. These rings 106 are flat with knife edges facing the guide cables 104 with an inside diameter of 1 millimeter (0.04 inches) larger than the outer diameter of the conducting guide cables 104. All of the sensor rings 106 are wired to a central control point that monitors the tube alignment. An electrical current is passed through the conducting jackets of the cables 104 so that if it comes in contact with any sensor ring 106 a current will be sent into it which is transmitted to the central control point. The monitor will immediately identify the section of tube that is out of alignment. Three cables are provided as a cross-check.

The vacuum tube 38 between a station and it's anchor points 80 follow smooth transition curves. The alignment in these sections is not as critical as the alignment between the anchor points 80 because the vehicles will be moving at much slower speeds. The tube 38 is still supported by the cables 92 in these sections but without the cradle cables 96.

Figure 11:
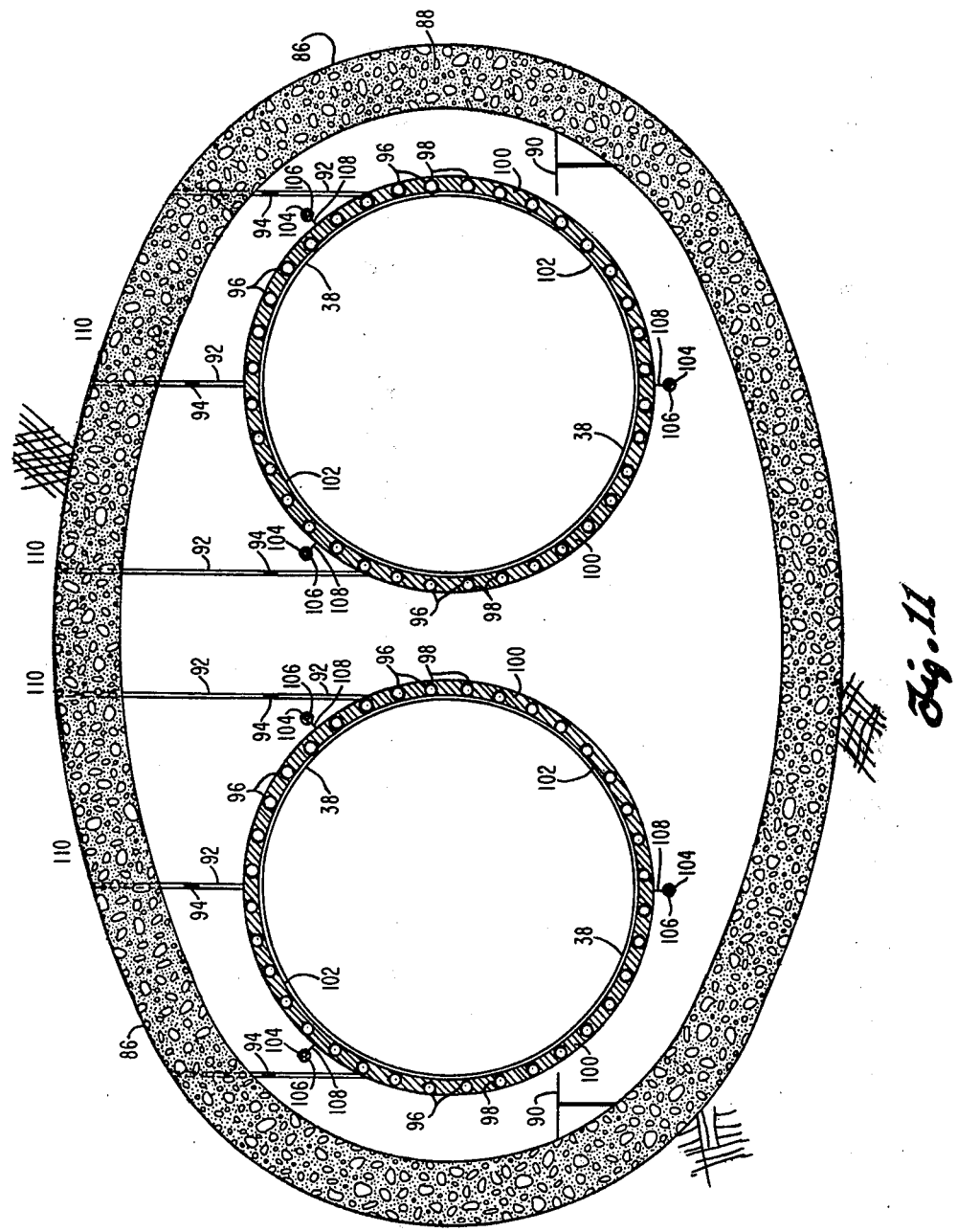
FIG. 11 is a transverse vertical cross-section of two vacuum tubes suspended independently of each other side by side inside one tunnel for two-way traffic.

The actual tunnel construction and vacuum tube insertion is accomplished by first boring out the initial tunnel 86 to very high accuracy using modern high speed automatic tunnel boring machines guided by laser beams. See "Rock Mole Finishes Bore in a Flourish of Records", *Construction Methods and Equipment*, March 1973, pp. 106–110, by D. Etheridge; and "Deep in the Earth with the Monster Moles", *Popular Science*, August 1973, pp. 84-87, by R. Gannon. These machines can be fitted with cutting edges that can bore directly through solid granite rock where compressive forces exceed 30,000 psi. (See, "Hard-rock moles succeed where others failed", *Construction Methods and Equipment*, Sept. 1973, pp. 64-66, by E. Young.) The initial tunnel is lined with a reinforced concrete liner 88 that is 30 cm to 50 cm (11.8 inches to 19.7 inches) thick and fitted with steel suspension bars 110 (FIG. 3). Then the vertical suspension cables 92 are hung and attached to flanges 100 which are fastened to the stiffener sleeves 102. The main suspension cables 96 are inserted through the holes 98 in the flanges 100 and tension is applied at the anchor points 80 to give them the smooth catenary shape. The vacuum tube 38 is assembled by sliding 16 meter sections (52.5 feet) one by one into the stiffener sleeves 102 that have an adjustable diameter slightly larger than the outside diameter of the tubular sections. These sections are then joined together so as to form one continuous vacuum tube 38. FIG. 11 illustrates how two such tubes 38 can be mounted according to the above principles in one tunnel 86 to give two-way traffic. The tubes are suspended independently of each other and are not connected.

There is one particular application of a gravity powered transportation system that would be very useful and that would not require excessive excavation and construction. The cars would be relatively small as shown in FIG. 3 and only one relatively small vacuum tube as shown in FIG. 9 would be required. One vehicle would shuttle back and forth between only two stations located at the end points. Such a system would be ideal in shuttling passengers between the central business district of a large city and a remote airport. The following table sets forth the straight line distance D, transit time T, maximum tube depth d, maximum speed $V_{max}$ and average speed $\bar{V}$, for gravity powered transportation systems connecting a few major airports and their corresponding central business districts.

| Performance Characteristics of a Gravity Propelled Transit System Between a City's Central Business District and its Remote Airport | | | | | | | | |
|---|---|---|---|---|---|---|---|---|
| Location | D(km) | D(miles) | T(min) | d(m) | d(feet) | $V_{max}$(m/sec) | $V_{max}$(mph) | $\bar{V}$(m/sec) | $\bar{V}$(mph) |
| JFK-New York | 20.00 | 12.43 | 2.87 | 1800.8 | 5908 | 187.9 | 420.3 | 116.2 | 259.9 |
| Dulles-Wash DC | 35.40 | 22.00 | 3.82 | 3187.4 | 10457 | 249.9 | 559.0 | 154.4 | 345.4 |
| O'Hare-Chicago | 23.54 | 14.63 | 3.11 | 2537.3 | 8324 | 223.0 | 498.8 | 126.2 | 282.3 |
| LAX-LA | 19.00 | 11.81 | 2.79 | 1710.8 | 5613 | 183.1 | 409.6 | 113.5 | 253.9 |

The results clearly demonstrate the exceedingly high performance capabilities that a gravity powered transportation system can offer as a solution to the airport access problem. For example, if the seating capacity per car (FIG. 3) is 48 with standing room for another 40 passengers, then a train of 10 cars could shuttle 880 passengers per trip. Assuming that passenger transfer at the stations can be achieved in 2 minutes (which is quite reasonable) this gravity powered shuttle train would be capable of making six round trips per hour between New York's JFK Airport and Grand Central Station on Manhattan Island carrying a total of 10,560 passengers. Hence, between the hours of 7 A.M. and 11 P.M., the system could shuttle a total of 168,960 passengers. Moreover, this could be easily increased by adding more cars. The system would be environmentally clean with absolutely no air pollution, noise pollution or sight pollution and it would operate essentially indefinitely without consuming essentially any energy.

Another ideal application for the gravity transit system would be in high population urban areas. As demonstrated above such a system would provide the fastest possible transportation with essentially zero energy expenditure. It would never become obsolete. This application would be much larger than an airport access system and would require many vehicles moving simultaneously in opposite directions. The system could employ tunnels having two vacuum tube guideways suspended in them for two way traffic as shown in FIG. 11.

Figure 12:
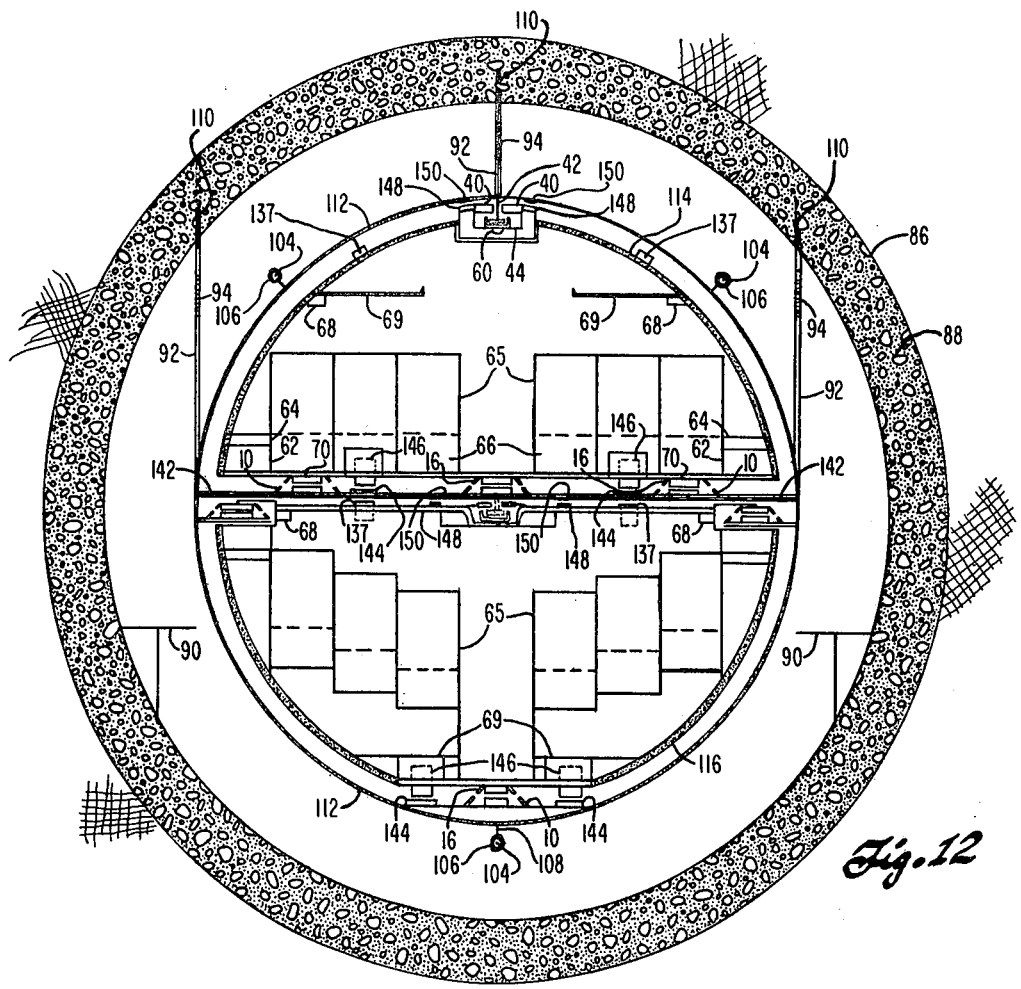
FIG. 12 is a transverse vertical cross-section of one split-level vacuum tube suspended in the tunnel that allows two-way traffic to flow simultaneously through the single tube.

As an alternative to using two separate vacuum tubes 38 to carry two way traffic as shown in FIG. 11, a single, two-level vacuum tube 112 is provided as shown in FIG. 12. Of course, this double level tube 112 will have a greater diameter than the single level tube 38 but it may offer a considerable economic savings. It will be suspended inside the initial tunnel according to the principles discussed above and shown in FIG. 9. The cars will move in opposite directions on each level and will be completely independent of each other. They will have semi-cylindrical shapes with very close vehicle/tube wall clearances (FIG. 13). The Magnarail suspension system described above is attached to the bottoms of the upper level cars 114 that have flat bases and attached to the top of the lower level cars 116 that have flat tops. Very close vehicle/tube wall clearances will be possible because of the tube's vacuum environment, which eliminates aerodynamic drag and buffeting and because of the exceptionally smooth riding, permanent magnet, frictionless suspension system. This tube and vehicle design allows maximum utilization of the tube 112 and tunnel 86 that could result in significant savings in the cost of tunneling, materials and construction. However, the added weight and size of the double level tube sections may cause construction problems in urban areas that might make the single level vacuum tube design more economical.

Since the interior of the tunnel 86 does not require the installation of permanent ventilation systems, side passageways, escape hatches, lighting systems, power pickup "third-rails" or power generating stations, the cost of the tunnel and tube installation will be relatively low. However, vacuum pumps 118 will be required to maintain a constant hard vacuum inside the tubes. These pumps 118 will be located near the stations (FIG. 8). Special attention will be given to making the tubes air tight so that air leakage can be kept at a minimum. This will reduce the energy expenditure caused by operating the vacuum pumps. Once the initial vacuum is drawn, the tubes will be permanently sealed. However, valves 71 (FIG. 8) will be provided to break the vacuum if repair work is required inside the tubes. According to the present embodiment the vacuum will be at a pressure of $10^{-3}$ torr ($1.3 \times 10^{-6}$ atmospheres). This vacuum will, for all practical purposes, completely eliminate all aerodynamic drag.

The constant, hard vacuum environment of the guideway tubes requires features not found in prior art ground transportation systems. The operating vehicles will be constantly exposed to this hard vacuum environment even while at stations during the boarding and unboarding of passengers or freight. A system of air-locks 120 (FIG. 14) is provided in each station for both upper level and lower level vehicles which engage only the doors, leaving all other parts of the vehicles exposed to the tube's vacuum environment. This system will be described for the more complicated double level system shown in FIG. 13. The system used on single level tubes (FIG. 3) is completely analogous.

Figure 14:
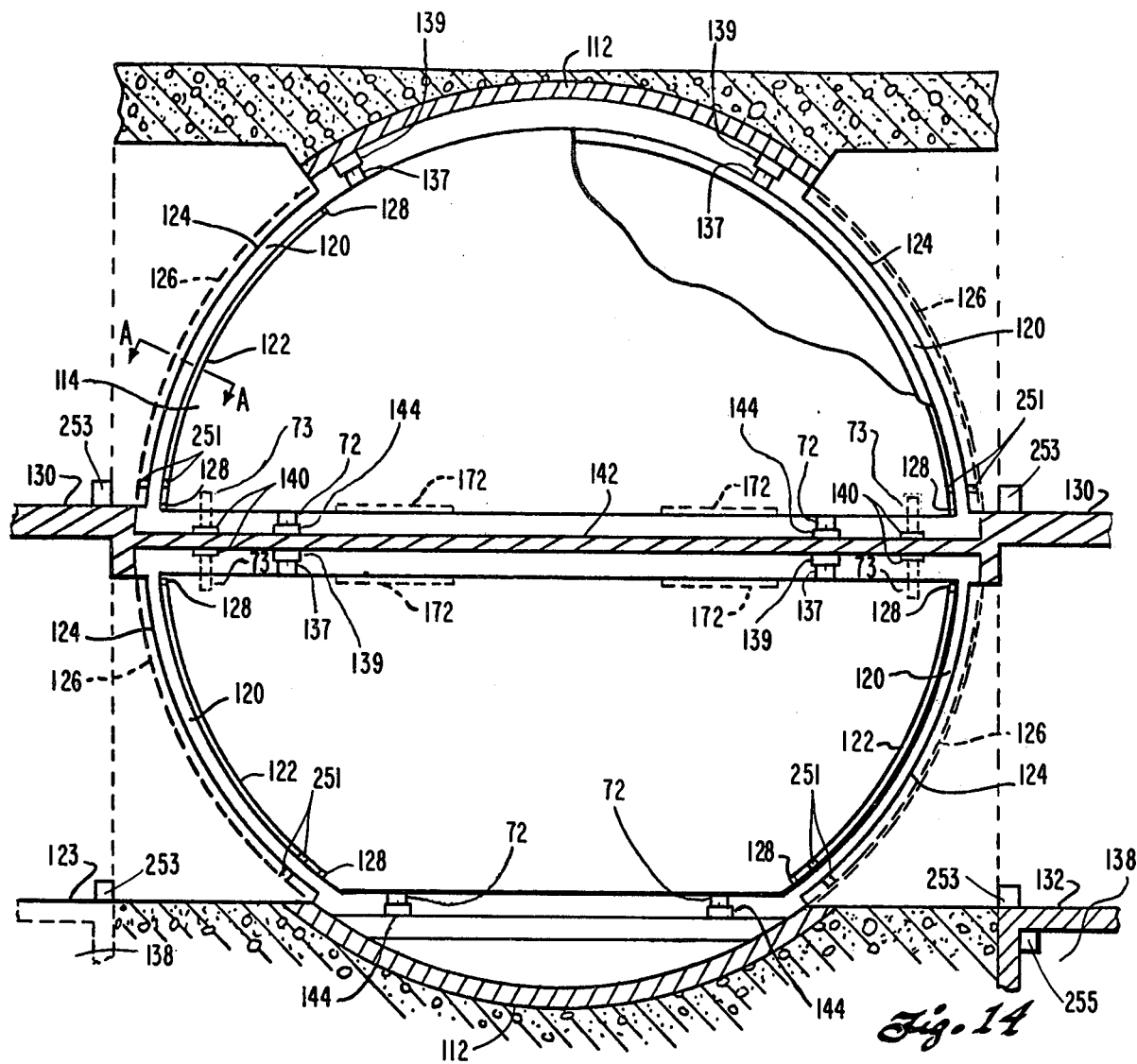
FIG. 14 is a schematic transverse vertical cross-section showing an upper lever car and a lower level car stopped at a station inside a split-level vacuum tube guideway illustrating the air-locks that permit direct passage between a car's interior and a station platform while the car remains in the hard vacuum environment.

The air-locks 120 are equally spaced in each station so that when a train (composed of a series of detachably coupled cars) is stopped at a certain point, all the car doors 122 are opposite air-locks 120 (FIG. 14). The air-locks 120 engage each car door 122 by flanges 124 that completely surround air-tight doors 126 in the tube walls (FIG. 13). When the flanges 124 that surround the tube doors 126 are extended from the tube wall, they fit into air-tight slots 128 that also completely surround each car door 122. The effect of this connection seals off a small volume of space bounded by the flanges 124, the car door 122 and the tube wall door 126 and forms the air-lock 120. Air is allowed to pass into this air-lock 120 until atmospheric pressure is reached. This is accomplished by opening valves 251 (FIG. 14) on the car door 122 and/or the tube door 126 to allow air at atmospheric pressure to pass into the airlock 120 from the station and/or from the car's cabin. The car doors 122 and tube wall doors 126 are then opened, allowing passengers to move between the station and each car while the exterior of the car remains in the tube's hard vacuum environment.

FIG. 16 is an enlarged transverse cross-section of the air-lock system 120 taken along line A—A of FIG. 14. The flange 124 has a rectangular longitudinal cross-section that is larger than the tube door 126 and car door 122 (see FIG. 13). This flange is shown (FIG. 16) extended 75 (during the transfer of passengers) and in the retracted position 77 shown in phantom. The car door and tube door are shown in the open positions 79, 81 respectively (during the transfer of passengers) and in the closed positions 83, 85 respectively shown in phantom. When the flange is in the extended position 75, one end 87 fits into the air-tight slot 128 that completely surrounds the car door 83. This connection forms an air-tight seam 89 completely around the car door 83. This seam 89 will be described later. Two other air-tight seams 91, 93 are provided between the other end of the flange and the vacuum tube 112. These seams wrap completely around the inside periphery and outside periphery of the extended flange 75. Similar air-tight seams 95, 97 are also provided for the car door 83 and tube door 85 respectively. These seams 91, 93, 95 and 97 are expandable and operate with the injection of a suitable hydraulic pressure fluid.

Figure 17:
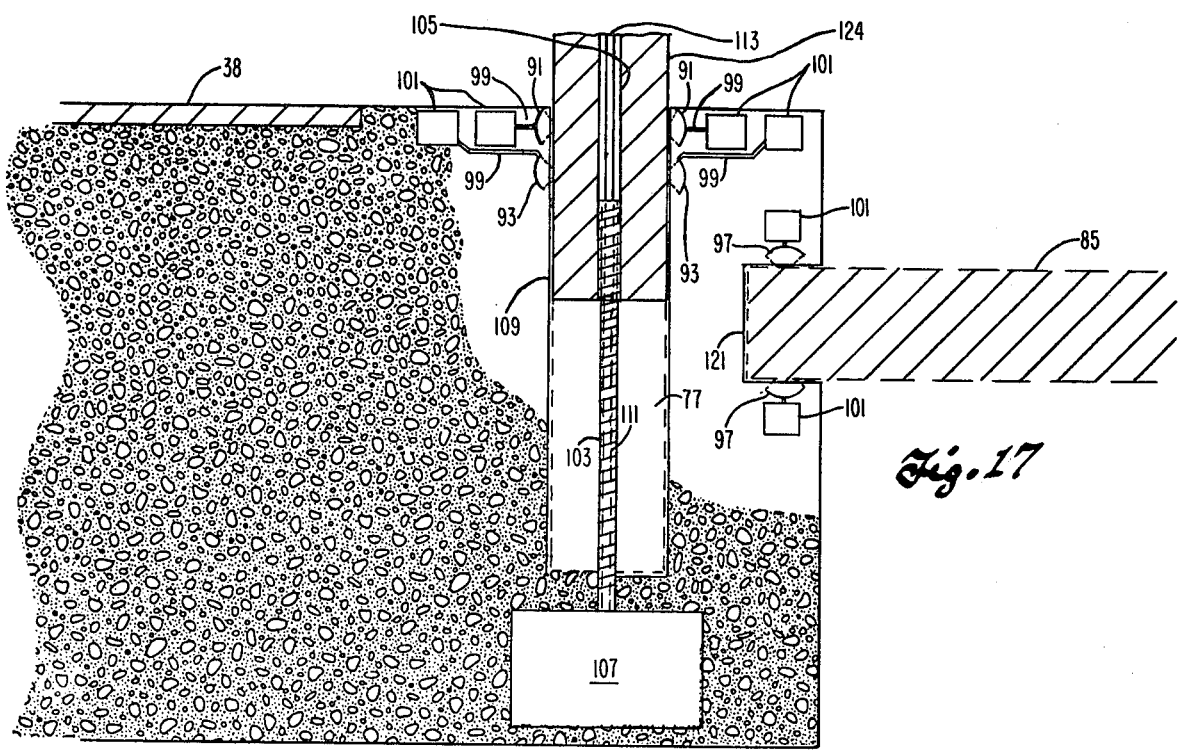
FIG. 17 is an enlarged section of FIG. 16 illustrating some of the expandable seals of the station-car, air-lock system and the mechanism for moving the flange that forms the air-lock.

FIG. 17 which is an enlarged section of FIG. 16 shows a few of these expandable seals 91, 93, 97 with the related hydraulic tubing 99 and related support systems 101. For a detailed discussion of these expandable air-tight seals see U.S. Pat. No. 3,678,624 filed Oct. 12, 1970 by Vincent Bicischi entitled "Door With Double-Inflatable Seal and Pressure Chamber". The flange 124 is extended and retracted (perpendicular to the tube wall) by a plurality of worm screws 103 that engage threaded holes 105 inside the flange 124. These worm screws are driven by electric motors 107. When the worm screws 103 are turned, the flange 124 is pulled into the flange housing 109 (retracted) or forced outward from the housing 109 (extended). This screw 103 is hollow and contains another hollow rod 111 inside it (FIG. 18). This second hollow rod 111 has a cylindrical exterior and hexagonal interior surface and is also turned by the electric motor 107. A solid hexagonal connecting rod 113 fits into the hexagonal hole of the rod 111 so that when the hollow rod 111 is turned, the rod 113 turns also. But this rod 113 is free to move in and out of the hollow rod 111 without restriction. Its end is connected to a locking bolt located on the end 87 of the flange 124 which fits into the air-tight slot 128 surrounding the car door 83. This locking bolt locks the end 87 of the flange 124 into the slot 128 so that the vacuum seal cannot be accidentally broken or otherwise disturbed when in place. (Further details of similar structure is given later in connection with the car coupling system.) The car door 122 and tube door 126 are sliding pressure doors. The car door 122 is opened by sliding it into a housing 115 built into the car's pressure hull 117. Similarly, the tube door 126 is opened by sliding it into a housing structure 119 adjacent the vacuum tube 112. The car and tube doors are moved by electric motors 123 and 125 respectively. When in the closed position, the entire end periphery of the car door and tube door fit into slots 121 to increase its strength because the vacuum environment will create very high forces due to the differential in air pressure. For example, if the doors have an area of 26 feet$^2$ that is exposed to the vacuum environment (which would be typical for this system) the air-pressure differential acting on it would be 55,037 lbs. Thus, the doors and adjacent structure will have to be extremely strong. However, in principle these doors will operate according to the principles taught by Wilford Nystrom in his U.S. Pat. No. 3,407,536 filed June 22, 1966 entitled, "Sliding Door". The interiors of each station adjacent the vacuum tube 112 have two levels, one level 130, serving passengers riding on upper level trains 114 and the other level 132, serving passengers riding on lower level trains 116 (FIG. 14).

Before leaving the station, the car doors 122 and tube wall doors 126 are closed and the air is evacuated from the air-locks 120. Since the volume of the air-locks 120 is small (e.g., 10 liters or less) it does not take long to evacuate it down to the $10^{-3}$ torr level of the tube. If the train is composed of 5 cars, for example, there are 10 air-locks to evacuate simultaneously (assuming two doors per car). This is accomplished in two stages. First, a valve 252 (FIG. 13) connected to a vacuum conduit 134 that leads to a central high capacity oil-seal vacuum pump 253 (FIG. 14) is opened in each air-lock so that the pressure is reduced to about 1 torr. This takes less than 5 seconds. The valves are then closed and another valve 254 (FIG. 13), located just below each air-lock, is opened. This valve 254 is connected to another vacuum conduit 136 that leads to a large vacuum tank 138 (FIG. 14) of about 40 cubic meters evacuated to a pressure of about $10^{-6}$ torr. Each station is equipped with two of these vacuum storage tanks 138 which are used to evacuate the air-locks 120 on each of the two levels to the required final vacuum of $10^{-3}$ torr. Thus, when these second valves 254 are opened in each air-lock 120, the pressure is further reduced to about $10^{-3}$ torr or less, depending upon how many air-locks dump their residual air in the common vacuum storage tank 138. A relatively low power, high vacuum diffusion pump 255 (FIG. 14) that operates continuously restores the vacuum storage tank 138 to its $10^{-6}$ torr level before the next train arrives. The simultaneous pressure reduction from 1 torr to $10^{-3}$ torr in each air-lock is accomplished very quickly when the second valves 254 are opened. The flanges 124 are then retracted and the train departs. This is an important feature of the system because it allows the train to depart from the station without having to wait a long time until an operating vacuum has been restored as would be the case if much larger air-locks were used that contain an entire car or train. A few larger air-locks are used, however, for adding or removing cars in servicing areas. But they are not used in regular passenger service.

When a train arrives at a station it must be stopped at a precise point so that each car door 122 is properly positioned to receive the flanges 124. The vehicle coupling system keeps the cars separated by a constant distance even under compression or tension forces. In order to insure proper door-flange alignment for each car, a special vehicle alignment system is provided in each station. This system consists of grooved guide wheels 137 located on the top of each car (FIGS. 3 and 14) and grooved guide wheels 72 located on the vehicle's lower portion that fit into flanged guide rails 139 above the vehicle and flanged guide rails 144 below the vehicle (FIG. 15). The guide rails 139 are installed in the tube's horizontal section that is adjacent each station. All of these rails are rigidly aligned inside the tube with an accuracy of ±0.02 cm and positioned such that the guide rails 139 above the vehicle compresses the vehicle downward against the lower guide rails 144 such that the vehicle is rigidly constrained to hold a very accurate transverse and vertical alignment as it rolls on these guide rails in the immediate vicinity of the station. The correct longitudinal positioning is accomplished initially by the computer controlled regenerative braking that stops the train within ±10 cm (±3.94 inches) of the required stopping point. After this is accomplished, a pair of positioning arms 140 (FIG. 14), that are attached to some of the horizontal trusses 142, flip down near the ends and on each side of the lower level cars 116 and flip up near the ends and on each side of upper level cars 114 into small recesses 73 built into the pressure hulls near the ends of each car. These positioning arms 140 move the train slightly to the correct final longitudinal position with high accuracy (e.g., ±0.1 cm or ±0.04 inches.) These positioning arms 140 also serve as electrical conduits which feed in electrical current that is stored in the vehicle's energy storage system. (Although the vehicle's propulsion requires essentially zero energy there will be a constant drain of electrical current by the vehicle's environmental control systems. But this drain should not exceed three or four kilowatts per car.)

After the vehicle stops at a station and is properly aligned, the flanges 124 are extended into the slots 128 surrounding each car door and the air-lock pressurization begins. After the train makes its initial stop, alignment and air-lock pressurization is completed in all cars in about 15 seconds and the doors are opened.

Each car has two doors 122 located on opposite ends and opposite sides. Passenger movement proceeds efficiently by allowing passengers to enter the car by one door and exit through the other. After passengers (and/or freight) have been exchanged, the doors are closed and the air-locks 120 are evacuated. The input electrical power is cut off, the flipper arms 140 are raised and the train departs from the station about 25 seconds after the doors are closed.

The cabin of each car has a pressure hull design for pressurization to 1 atmosphere. They are equipped with their own life support equipment and environmental control systems that includes pressurized air tanks, air conditioners and circulators, temperature and humidity regulators, carbon dioxide removal systems, air purifiers, lighting, etc., with adequate reserves in the event a train is stopped between stations due to malfunction. Emergency oxygen masks are provided above the seats which automatically appear in the event of a serious loss of cabin pressure. (Adequate reserve air is carried to compensate for relatively small punctures that might occur in the cabin's pressure hull.) Each car in a train is connected to adjacent cars by flexible umbilical lines 152 so that pressurized air and/or electric power can be supplied from neighboring cars if needed (FIG. 19).

The coupling system is also radically different from prior-art transportation systems. Adjacent cars 154 (FIG. 19) are joined to each other by an air-tight seam 156 that completely surrounds the end rims of each of the adjacent cars. The transverse cross-section at this coupling seam is identical to the transverse cross-section of the car's body. There is no vertical partition or door along this joining seam 156. The walls 158 of the car, 20 cm on each side of the seam 156, are made of thermoplastic elastomers. This is a tough but deformable material that can be compressed longtudinally and bent slightly in transverse and vertical directions. (See "Manual 258: Thermoplastic Elastomers", *Materials Engineering*, Volume 82, No. 7, December 1975, pp 47–52). This material provides a 40 cm articulated section between adjacent cars that is stiff but flexible enough to enable a train of coupled cars to negotiate relatively sharp curves. The car's regular pressure hull 160 begins after this section and runs throughout the length of each car. A vertical pressure bulkhead 162 (see FIG. 19 and FIG. 20) that is located 2 meters from the seam 156 seperates the interior 164 of each car from the air-tight flexible seam 156. Air-tight sliding doors 166 are mounted on the bulkheads 162 to permit passage. (These doors are constructed similiar to the car's sliding pressure doors 122 described above.) The region between the adjacent doors 166 forms an air-lock 168 that is completely independent from each of the car's interior cabin. It contains its own life support equipment, lighting and control systems 170. This air-lock is four meters (13.12 feet) long and can accomodate 30 standing persons. Under ordinary operating conditions, this air-lock is never occupied (although it is always pressurized) and the pressure bulkhead doors 166 are always kept closed. If an emergency develops where one of the cars in a train begins leaking air at a rate faster than the back-up systems can replace it, the entire car has to be abandoned. The pressure doors 166 at each end of the damaged car's cabin are automatically opened. Half of the passengers exit the car through one door 166 and the other half exit through the other. The doors are closed and the passengers are safely contained in the two air-locks 168 that are located on each end of the malfunctioning car. The opposite doors of each of the air-locks 168 are opened and the passengers enter the adjacent cars to finish the trip in them (or they could go on to other cars by passing through the other air-locks). If the malfunctioning car is at one of the ends of the train, an orderly evacuation can be accomplished through only one air-lock. This escape air-lock system is extremely valuable as it allows evacuation of a malfunctioning car while the train is moving at very high speeds in the vacuum tube without having to stop. Notice that since the ends of all cars are equipped with these air-lock systems, both ends of every train of coupled cars also have these air-lock coupling systems. Thus, if a train has to be stopped between stations due to a malfunction, it can be easily evacuated by bringing up the train immediately behind or ahead of the malfunctioning train and coupling to it. The passengers are evacuated by passing through the resulting air-lock (which is identical to all other air-locks between individual cars). Hence, this evacuation system also allows passengers trapped in an entire train between stations to be easily evacuated by transfering to a neighboring train without ever having to pressurize the vacuum tube. Thus, every train immediately ahead or behind every other train can always be used as an emergency evacuation vehicle.

Figure 21:
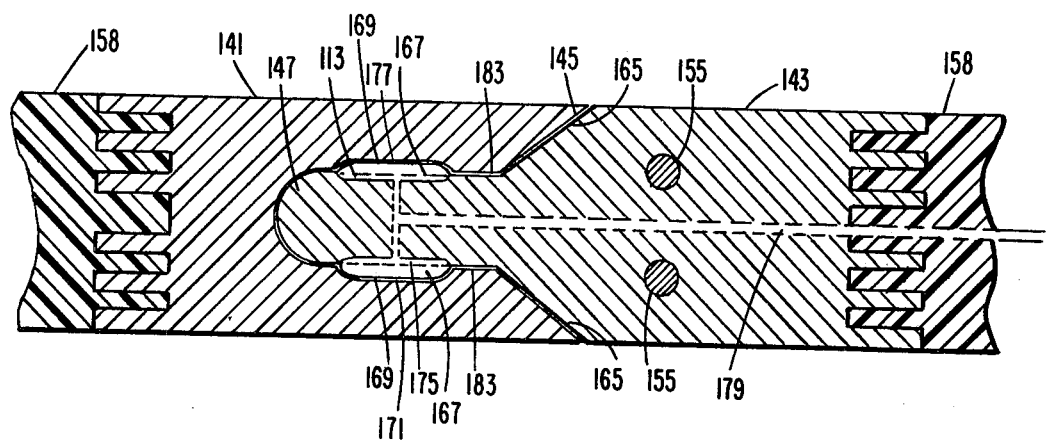
FIG. 21 is a longitudinal cross-section through the air-tight car coupling seam illustrating the inflatable seals.
Figure 22:
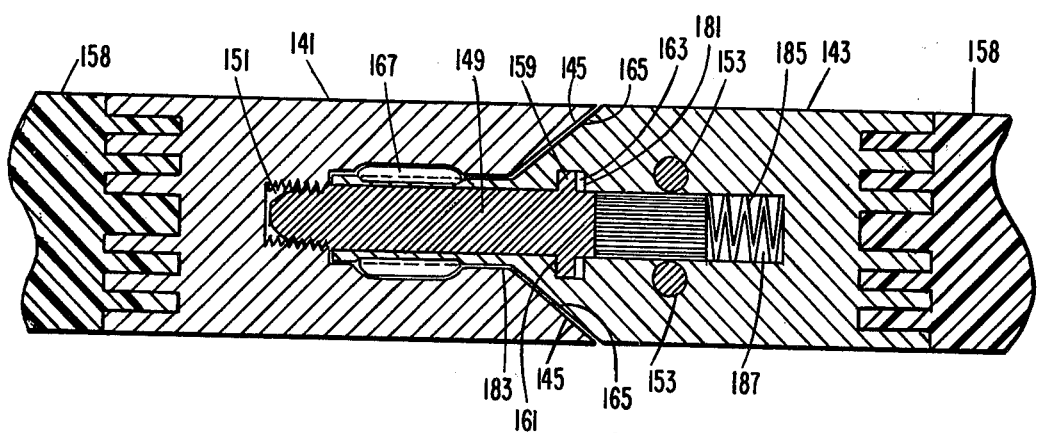
FIG. 22 is a longitudinal cross-section through the air-tight car coupling seam illustrating the locking bolt mechanism.

Longitudinal cross-sections illustrating the construction details of the air-tight car coupling seam 156 is shown in FIG. 21 and FIG. 22. This air-tight coupling system (which extends around the entire perphery of each end of each car) comprises a 4 cm thick aluminum female member 141 attached to one end of the car and a 4 cm thick aluminum male member 143 attached to the other end. The coupling is accomplished by joining the female and male members. The female member 141 has a tapered receiving aperture rim 145 and the male member 143 has a rounded 1.5 cm diameter nose portion 147 which serves to initially align the two members during the initial insertion. After the initial insertion is accomplished a plurality of 1 cm diameter steel locking bolts 149 located inside the aluminum male member 143 (FIG. 22) are screwed into threaded holes 151 located inside the female member 141. These locking bolts 149, which have smooth tapered ends for roll alignment, are located every 30 cm (11.81 inches) around the periphery of the male member 143. They are turned by two contra-rotating worm gears 153 attached to semi-flexible high torque steel rods 155 that extend continuously inside the perphery of the male member 143. When these rods are rotated in contra-rotating directions, all of the locking bolts 149 are simultaneously screwed into or out of the holes 151. The gear ratio is such that about 200 rotations of the worm gear 153 (and rods 155) are required for one rotation of the bolt 149. The rods 155 are driven by a plurality of small electric motors 157 mounted near the rim of the male member (FIG. 19).

Figure 23:
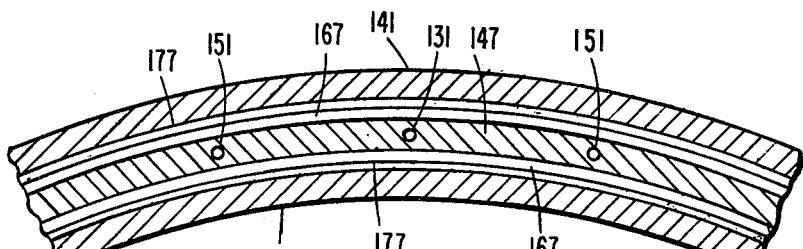
FIG. 23 is a transverse cross-section through the air-tight car coupling seam illustrating the inflatable seals.

When each bolt 149 is screwed into its respective hole 151, a flange 159 (FIG. 22) that is part of the bolt 149 is forced against a wall 161 of a small cavity 163 inside the male member 143 surrounding part of the bolt 149. This results in firmly locking the female and male members together. The surface of the male member adjacent the female aperture 145 is fitted with two thin rubber like gasket strips 165 extending continuously around the entire perphery of the male member 143 so that when the locking bolts 149 are screwed tight, the female aperture 145 is pressed firmly against the rubber like gasket strips 165 so as to form two air-tight seams. Other parts of the joining surface members are also made air-tight by an entirely seperate and independant system. This system utilizes high pressure inflatable seals extending continuously around the periphery of the nose 147 of the male member 143 (FIGS. 21,22). After the bolts 149 have been screwed in and tightened, a suitable hydraulic pressure fluid 167 is forced into small inflatible seals 169. These seals expand and provide a strong sealing contact against the adjacent walls 171 of the female member 141. Before this fluid is introduced, the seals 169 are contracted into two thin cavities 173, 175, inside the nose 147 such that the diameter of this section of nose containing these cavities is less than the diameter of that part of the nose not containing these cavities. A transverse cross-section showing these cavities full of hydraulic fluid is shown in FIG. 23. The wall's of the female member adjacent the expandable seals are coated with a thin layer of an elastomeric gasket material 177 so as to increase the air-tight integrety of the expandable seal. The hydraulic fluid 167 enters the cavities 173, 175 by tubing 179 inside the male member 143. The pressure in this fluid is approximately 300 psi so that the resulting seal is absolutely air-tight.

Two adjacent cars 154 (FIG. 19) are decoupled (in a vacuum enviroment) by first evacuating the air-lock 168 down to the pressure of the vaccum tube (i.e., $10^{-3}$ torr). Then the hydraulic fluid is pumped out of the seals 169 thereby collapsing them (by their own elasticity) into the cavities 173, 175. Next, the electric motors 157 are started which simultaneously unscrews all of the locking bolts 149. During this unscrewing process the flange 159 of each bolt 149 is forced up against the opposite wall 181 of the flange cavity 163 which forces the union of the female member 141 and male member 143 of the coupling system apart in the event they become stuck together due to possible contact friction between the inflatable seal 169 and the throat 183 of the female member 141. A spring 185 located in another small cavity 187 in the male member 143 adjacent the butt end of the locking bolt 149 keeps a constant outward force on the butt of the bolt so that all of the locking bolts always extend outward from the nose 147 at equal distances during the initial coupling. This spring 185 also gives the bolt 149 a resiliency when it first makes contact with the female member 141 during car coupling. It also provides a slight push away from the female member when the cars are uncoupled thereby giving complete seperation. A slightly flexible 4 cm thick, 20 cm long section 158 is mounted between the adjacent car's pressure hull 160 (FIG. 19) and the female and male members of the coupling seam 156 (FIGS. 21,22). When a coupling between adjacent cars is completed, the male and female members are rigidly connected to each other. But two adjacent coupled cars 154 can move slightly relative to each other because of the two stiff but slightly flexible sections 158. Hence, this coupling system enables an entire train of many coupled cars to remain completely air-tight; allow passengers to move freely from car to car; enable one or more malfunctioning cars to be sealed off from the operating cars; and allows the train to negotiate relatively sharp curves in both horizontal and vertical planes.

A scaled down version of this air-tight coupling system is used to effect the air-tight connection between the flange 124 surrounding a tube pressure door 126 and the slot 128 surrounding the adjacent pressure door 122 of a car. In this application the end of the flange 124 is the male member and the slot 128 is the female member. However, since the volume of the air-lock 120 is much smaller than the volume of the on-board air-lock 168, and since usage time is less, the secondary inflatable sealing system would probably not be necessary. The connecting rod 113 (FIG. 17) could also be connected directly to the butt end of the locking bolt 149 (FIG. 22) and the worm screw 153 and flexible rods 155 could be discarded. The rod 113 could also be used to turn the rods 155 if this arrangement is more desirable.

Figure 24:
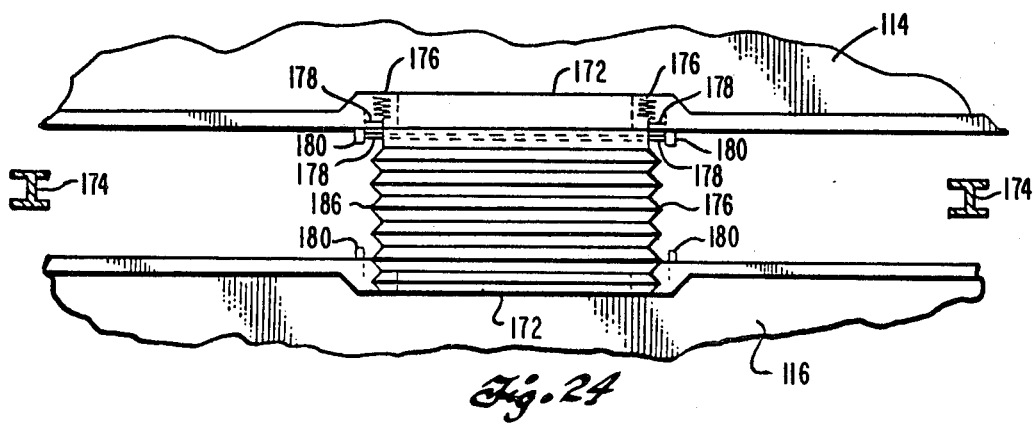

Since the vehicles in this gravity propelled rapid transit system travel through a hostile enviroment of vacuum tubes, passenger safety will be an important consideration. Thus, in addition to the primary car and train evacuation system described above, a secondary, back-up passenger evacuation system is also provided. However, this evacuation system is only installed when the double level vaccum tubes are used (FIG. 13). As illustrated in FIG. 14, a small, air-tight circular escape hatch 172 is installed in the air-locks 168 on each end of each car on the floors of upper level cars 114, and on the ceilings of lower level cars 116 (see also FIG. 24). They are positioned such that when a lower level car 116 is directly under an upper level car 114, the escape hatches 172 are directly opposite each other on each side of the partition frame 174 and not obstructed by any rails or any other structure. Each escape hatch 172 is equipped with a retractable flexible tube 176, with an expanding end diameter 178, that can be extended manually between the open partition beams 174 to engage an air-tight circular rim 180 surrounding the other escape hatch 172. The air-lock, resulting from the connection, is then pressurized to atmospheric pressure so that the escape hatches 172 in both vehicles can be opened. Thus, every upper level vehicle 114 is capable of rescuing passengers stranded in any lower level vehicle 116 and vice versa.

There are two escape hatches 172 in each car. The longutidinal distance between these two hatches 172 is not commensurate with a mutiple of the distance between adjacent transverse cross beams 174 that comprise the partition frame within the double level vaccum tube 112. This escape system and the above described system between adjacent cars will alleviate possible psycological fears a person may have regarding the possibility of finding oneself in a malfunctioning car or stranded train within a small vaccum tube deep underground. Since no costly emergency tube pressurization system, tube escape doors and passegeways are required in these escape systems (nothing need be added to the tube and tunnel system) it will not increase the tube and tunnel construction cost.

The above described gravity propelled rapid transit system can offer extremely fast and efficient, non-polluting, all-weather, ground transportation for (1) remote airport access, (2) high population urban areas, (3) inter-city systems and (4) intercontinental systems. For remote airport access and urban areas where the station-to-station distances are less than about 50 km (31.1 miles) the tubes follow smooth catenary paths between anchor points (near each station) that are joined by smooth transition paths leading into each station. The entire tube path between any two adjacent stations lies essentially in the vertical plane passing through the stations. The vehicle's flywheels are used primarily as on-board energy depositories for absorbing and generating excess kinetic energy arising from traveling between stations of different elevations. This scheme is adopted because energy transformations between gravitational potential energy and kinetic energy is essentially 100% efficient, while energy passage between the linear motor/generators and flywheel energy storage units will always result in some energy loss due to inherent inefficiencies. Unless the present physical laws of motion are overthrown, this gravity-powered rapid transit system offers extremely swift station-to-station, non-energy consuming service that could never be matched in efficiency and speed by any other rapid transit system, surface or subsurface that operates on a nearly horizontal plane and that doesn't restrain its passengers to their seats regardless of how advanced their propulsion systems may be. Thus, for the first time in the art of high speed ground transportation systems, the present system disclosed herein (along with my aforementioned system disclosed in U.S. Pat. No. 3,954,064 and U.S. Pat. No. 4,075,948) will never become obsolete due to possible improved performance of other prior art or future systems.

For station to station separation distances greater than about 50 kilometers, the tube would have an essentially straight and horizontal reach 256 (FIG. 25) at its deepest depth. The tube path on each side of the horizontal section follows smooth ascending curves 257 that lead up to each station $S_1$, $S_2$, where they level off.

For intercity systems where typical station separation distances might average 100 km (62.1 miles), tunnel depths for this gravity propelled flywheel boosted rapid transit system range between 1,000 meters (3,281 feet) and 5,000 meters (16,404 feet) and give gravitational coasting speeds of 140 meters/sec (313 mph) and 313 meters/sec (700 mph) respectively. A gravity propelled flywheel boosted rapid transit system is ideally suited for the critically important and much needed "Northeast Corridor" system where the surface congestion and costly right-of-way problems would be completely eliminated by deep underground tunneling (see, "Recommendations for Northeast Corridor Transportation," Vol. I–III, U.S. Department of Transportation, May 1971). It will also provide an ideal system for directly linking the major cities of Europe (such as London and Paris.)

Finally, the gravity propelled flywheel boosted rapid transit system also has the capibility of providing underground inter-continental transportation that will be significantly faster than commercial jet airplanes, yet consume only a small fraction of the energy they consume. Since the vehicles will move esentially with low drag forces, the coast distance along a horizontal tube segment is largely independant of energy expenditure. All "horizontal sections" are actually circular arcs with radius equal to the earth's radius lying in the plane determined by the end points and the earth's center. They are very nearly equal to the great circles passing through the two cities. For distances between about 50 and 100 kilometers the sections 256 are almost straight and horizontal and have a vertical cross-sectional profile similar to that shown in FIG. 25. The cruising speed along the horizontal segment (i.e., great circle) can be significianly increased by flywheel proplusion. The added energy is recovered before the vehicle reaches the ascending part of the tube by regenerative braking. Thus, for inter-continental rapid transit systems each car will carry 3000 kg (6,615 lbs.) of flywheel energy storage units.

According to Post (see, U.S. Pat. No. 3,683,216) a conservative estimate for the energy storage capacity of 3,000 kg of flywheel inertial energy storage units is about $2.5 \times 10^9$ Joules. However, the enviromental and control systems of each car require only about 4 KW of continuous electrical power. If the car is propelled by gravity alone this essentially is all the power that is needed—which is neglible compared to the car's flywheel on-board energy storage capability. For inter-continental systems this flywheel energy will therefore be used to boost the gravitational coasting speed to higher levels.

As an example, suppose that the horizontal (i.e., great circle) depth, below sea level, of a direct San Francisco-New York 4,140 km (2,573 mile) long inter-continental rapid transit vaccum tube is 1,000 meters (3,281 feet). When passing under the continental divide the tube will be about 3,500 meters (11,500 feet) below the surface. Suppose that a vehicle, composed of several of the above described gravity propelled flywheel boosted cars, departs San Fransisco for New York. It will require approximately 0.70 minutes to reach the 1000 meter cruising depth when its gravity coasting speed will be 140 meters/sec (313.8 mph). As soon as the vehicle levels off and begins to move along the great circle portion of the tube it turns on its linear motors. If all of the $2.5 \times 10^9$ Joules of stored flywheel inertial energy is used to accelerate each car (with a full load of 52 passengers) the vehicle's speed will be boosted to 502.2 meters/sec (1,123.3 mph). If the linear motor in each car is rated at 1,200 KW, this boosting acceleration will take approximately 34.7 minutes during which time the vehicle travels over a distance of 739.8 km (460 miles) when it will be just entering the state of Utah. (Locating the electric power source on board the vehicle plays an important role since it would be almost impossible to collect power from a "third rail" at speeds above 300 mph.)

After the energy is nearly drained from the flywheels and converted into kinetic energy, the vehicle resumes its coasting (at the increased speed) for about 88.11 minutes during which time it travels a distance of 2,655 km (1,650 miles). At this point the vehicle will be passing almost directly below Toledo, Ohio. It then begins the regenerative braking which generates about 1,200 kw of electric power which is used to spin up the flywheels, returning almost all of the $2.5 \times 10^9$ Joules extracted during the boost phase. After the vehicle slows back down to 140 meters/sec, the ascending reach of the tube begins and the vehicle coasts all the way up converting its remaining kinetic energy into gravitational potential energy. The vehicle essentially automatically comes to a stop when the top of the climb is reached right in the heart of New York City. The entire trip takes about 2 hours and 39 minutes, giving an over-all average speed of 434 meters/sec (971 mph). If, according to Post, the electrical in-out efficiency of the flywheel energy storage units is 95% and if the efficiency of the linear motor/generators were 85%, approximately $8.7 \times 10^8$ Joules of energy per car would be lost due to inefficiencies. At the rate of 2 cents per kilowatt-hour this represents a total cost of $4.83 per car or about 9 cents per person. With the rapidly increasing cost of energy, this possibility is extremely attractive. Such a system would enable the seat cost for trips between major cities to be less than one half the current air-fair, yet with the anticipated traffic, enable the system to be extremely profitable.

The operation of gravity propelled vehicles is almost the direct antithesis of aircraft operations. For example, a large commercial jet airliner, say a Boing 747, begins its trip by climbing to high altitudes. If its gross take-off weight is 340,000 kg (750,000 lbs) and if its cruise altitude is 10,500 meters (34,450 feet) the climb requires an energy expenditure of about $3.6 \times 10^{10}$ Joules(which is unrecoverable). A gravity/flywheel, on the other hand, begins its trip by descending and therefore generating energy which is automatically converted into kinetic energy and used to complete the trip.

The practicality of the gravity propelled rapid transit system depends upon construstion and maintenance costs—the major contributing element of which is tunnel construction. But, with the aid of automatic devices these costs can be kept reasonably low. The circular tunnel design adopted in the preferred embodiment is ideally suited for economical high speed boring. Modern high speed automatic tunnel boring machines guided by laser beams are already available. This tunneling method will proceed rapidly and completely unnoticed on the surface with only a small fraction of the work force usually required for costly "cut-and-cover" subway excavations. (The "cut and cover" excavation techniques used in the construction of prior-art subway systems completely disrupts many busy city blocks for many months.) The tunnel's interior of the present system does not require any costly ventilation systems, side passageways, escape hatches, lighting, power pick up "third rails", or power generating stations. Of course, many continually operating vaccum pumps may have to be provided for the vaccum tube to compensate for air leakage but these can be centrally located. Moreover, with modern materials and vaccum seals that have essentially no leaks the air leakage problem is not great. By boring deep underground into bedrock no tunnel liner will be required, thus further reducing construction costs. Moreover, there will be essentially no right-of-way costs that are typical of prior art ground transportation systems. For installations along the densely populated Northeast Corridor, this elimination of right-of-way costs may bring the total construction costs of the gravity propelled system down to those of other systems such as 200 mph rail or tracked air systems. But unlike these prior art systems, the gravity propelled system disclosed herein would offer unmatched speed performance regardless of weather and without any noise, eye or air pollution and with essentially no expenditure of energy. The system would also be completely safe from possible obstacles that might be thrown into the guideway and would be essentially immune from any possible sabotage or terrorist attacks.

Although many thousands of tons of permanent ceramic brick magnets will be required, the raw materials they come from are very cheap and are plentiful. The ceramic methods common to ordinary brick-making can be applied to develop fully automatic manufacture of the brick magnets on a mass production basis. (The size and shape of all track brick magnets is identical.)

Construction costs may be high compared to other rapid transit systems but these costs have to be weighed against the obvious benefits. Earthquakes will present special construction problems for areas such as California (they are practically nonexistant east of the Mississippi River) but recent research indicates that it will be possible to predict earthquakes in advance and even control their intensity (see, "Earthquake Prediction", *Physics Today*, March, 1974, pp. 36–42 by C. Kisslinger).

Many modifications and variations of the above embodiments can be devised by one skilled in the art. Thus, for example, instead of using ceramic magnets in the vehicle, much more powerful cobalt rare earth permanent magnets such as $SmCo_5$ could be used. This would double the distance between the tube's Magnarails and the vehicle's Magnarails. Similiar magnets could be used for the vehicle's lateral guidance system (if one is required). The geometrical arrangement of the levitating Magnarails could also be changed. The track and vehicle Magnarails could be placed at various locations on the vehicle. Moreover it may be more economical to use other types of magnetic suspension systems already taught in the prior art. These include electromagnetic attractive levitation systems as employed in the gravity propelled systems described in my aforementioned U.S. Pat. No. 4,075,948 or superconducting repulsive suspension. The former is based on utilizing the attractive force between an electromagnet and ferromagnetic rails laid along the guideway (see, "Lift and Drag Forces for the Attractive Electromagnetic Suspension System", *IEEE Transactions on Magnetics,* Vol. MAG-10, No 3, Sept. 1974 pp. 425-428, by R. Borcherts and L. Davis and U.S. Pat. No. 4,075,948. While unstable with constant current, stable operation of this suspension system is obtained by utlizing a feedback control circuit to maintain a constant gap between the pole of an electromagnet and a ferromagnetic rail.

The superconducting repulsive levitation systems derives its lifting force by magnetic forces of repulsion acting between high field superconducting magnets attached to the vehicle and secondary fields set up by eddy currents in conducting sheets (usually aluminum)

laid along the guideway (see, "Superconducting Levitations of High Speed Vehicles," *Transportation Engineering Journal*, Nov. 1973, pp. 873–885, by V. Arp et al.). When the vehicle is moving rapidly over the conducting sheet, eddy currents are generated in it by the principle of magnetic induction. Hence, in this system, the vehicle has to be moving in excess of about 10 meters/sec (22.4 mph) before any substantial lifting force can be generated that is enough to support the vehicle's weight.

There are many other magnetic levitation systems that could be used in the gravity propelled system disclosed in this application (see, *IEEE* Transactions on Magnetics, Vol. MAG-10, No. 3, Sept. 1974). However, it should be emphasized that the permanent magnet, self-centering, frictionless magnetic levitation system as taught in this invention is ideally suited for a gravity propelled transit system because unlike all other prior-art suspension systems, this suspension system has zero drag at all operating speeds and consumes no energy.

As various changes can be made in the above construction without departing from the scope of the invention, it is intended that all matter contained in the above description or shown in the accompanying drawings should be interpreted as illustrative and not in a limiting sense.

What is claimed is:

1. A rapid transit system comprising:
   a plurality of stations;
   an underground tube which slopes downwardly along a smooth curve between a pair of adjacent stations of said system;
   means for evacuating and maintaining vacuum in the tube;
   a vehicle in the tube;
   means for levitating said vehicle by a magnetic suspension system such that said vehicle is propelled essentially entirely by gravity when moving from one station to another station at equal elevations wherein acceleration propulsion is obtained by coasting down the descending arc of the vacuum tube, thereby generating vehicle kinetic energy substantially entirely from gravitational potential energy, and wherein deceleration is obtained by coasting up the ascending arc of the vacuum tube, thereby converting substantially all of the vehicle's kinetic energy back into gravitational potential energy to be used for making the next trip;
   means for starting and stopping said vehicle in the immediate vicinity of each station; and
   means for allowing passengers to pass between the said vehicle's interior and said station without removing the vehicle from the vacuum environment of the tube or without having to pressurize the tube.

2. A rapid transit system as set forth in claim 1 wherein said vehicle is suspended in said tube by magnetic forces.

3. A rapid transit system as set forth in claim 2 wherein said magnetic suspension of said vehicle comprises:
   a plurality of magnetic rails composed of permanent magnets of high coercivity extending lengthwise along the tube between adjacent stations; and
   a plurality of self-centering magnetic suspension rails composed of permanent magnets of high coercivity extending lengthwise on the vehicle for levitating the vehicle above the tube's magnetic rails by magnetic repulsion so that no part of the vehicle is in physical contact with any part of the tube;
   said magnetic suspension rails being partitioned lengthwise into several self-centering sections that are free to move independently of each other a limited distance such that each section remains properly aligned over the tube magnetic rails when the vehicle passes over curves in the vertical or horizontal planes.

4. A rapid transit system as set forth in claim 3 further comprising:
   skid rails mounted along the tube;
   stand-off skids mounted on the vehicle that ride adjacent said skid rails to prevent accidental contact between the levitating magnets.

5. A rapid transit system as set forth in claim 3 wherein said permanent magnet levitation system comprises a number of substantially rigid but independent vehicle suspension units that are free to move slightly in transverse and vertical planes so that said vehicle can negotiate curves of relatively small radius of curvature while each independent suspension unit remains properly positioned over the tube magnetic rails.

6. A rapid transit system as set forth in claim 2 further comprising:
   a plurality of tracks in the tube in the immediate vicinity of said station; and
   a plurality of wheels on said vehicle for supporting the vehicle on said tracks in the immediate vicinity of said station;
   the beginning section of said tracks being mounted in said tube such that as the vehicle approaches said station, its levitation is gradually shifted from non-contacting magnetic forces to said wheels contacting said tracks; and
   the end section of said tracks being mounted in said tube such that as the vehicle leaves said station its levitation is gradually shifted from said wheels contacting said tracks to non-contacting magnetic forces.

7. A rapid transit system as set forth in claim 6 wherein said means for stopping and starting said vehicle at said station comprises:
   regenerative electric motor/generators connected to said wheels for regenerative braking and propulsion; and
   energy storage means located on-board said vehicle for storing incoming electrical energy generated from regenerative braking and using this stored energy to power said motor/generators for starting said vehicle on its way to the next station.

8. A rapid transit system as set forth in claim 7 wherein said means for storing energy on-board vehicle comprises:
   flywheel motor/alternator kinetic energy storage units wherein incoming electrical energy is used to activate said motor which speeds up a flywheel thereby storing inertial energy and whereby energy is extracted from said flywheel by converting flywheel inertial energy into electrical energy by said alternator.

9. A rapid transit system as set forth in claim 6 further comprising means for switching the vehicle into various branches of tube intersections in the immediate vicinity of a station by conventional wheel and track switching systems.

10. A rapid transit system as set forth in claim 1 wherein the vehicle comprises a train of detachably coupled pressurized cars having pressure-tight doors, and means for coupling each car in the train so that a nearly constant car separation distance is maintained; and said means for allowing passengers to pass between the interior of the vehicle and a station without removing the vehicle from the vacuum environment of the tube comprises:

a plurality of pressure-tight doors through the wall of the vacuum tube at each station with predetermined separation distances such that when a train stops at a predetermined location in the station, all the car doors are opposite station doors;

air-tight retractable flanges built into the tube walls adjacent each tube door;

means for extending such a flange toward the car and inserting one end into sealing engagement with a slot completely surrounding the periphery of the car door such that the chamber bounded by the flange, tube door and car door becomes an air-lock;

means for pressurizing the air-lock to atmospheric pressure;

means for opening the car door and tube door after the air-lock has been pressurized to atmospheric pressure, thereby allowing passenger transfer; and means for closing the car door and tube door and evacuating the air-lock before retracting said flange.

11. A rapid transit system as set forth in claim 10 wherein said pressurization of such an air-lock comprises:

an air conduit leading from said air-lock to the interior of said station;

a valve connected to said conduit such that when opened, air is admitted into said air-lock from said station such that the atmospheric pressure in said air-lock becomes equal to atmospheric pressure in said station;

a vacuum pump;

a vacuum conduit leading from said air-lock to said vacuum pump;

a valve on saaid vacuum conduit such that when said valve is opened, said air-lock is partially evacuated;

a high vacuum storage tank having a working pressure significantly lower than that of said tube;

a high vacuum conduit leading from said air-lock to said vacuum storage tank; and a valve on said high vacuum conduit such that when said valve is opened, said air-lock is further evacuated by allowing residual air to pass from said air-lock into said vacuum storage tank.

12. A rapid transit system as set forth in claim 10 comprising a vehicle positioning system at each station so that said vehicle is properly aligned to receive said flanges when said vehicle stops at said station.

13. A rapid transit system as set forth in claim 12 wherein said vehicle alignment system comprises:

a plurality of grooved guide wheels mounted on the upper and lower portions of said vehicle; a plurality of flanged guide rails mounted in the tube in the immediate vicinity of the station such that as the vehicle approaches the station, the guide rails above the vehicle contact the vehicle's upper guide wheels and press the vehicle slightly downward onto the lower guide rails;

said upper guide wheels rolling on said upper guide rails and said lower guide wheels rolling on said lower guide rails such that said rail flanges fit into said wheel grooves so that the vehicle is held in predetermined transverse and vertical alignment while it is approaching and stopped in said tube adjacent said station;

means at each station for engaging and positioning the train so that each car door is positioned opposite a tube door and properly aligned to receive said air-lock flanges; and means for making electrical connections to the train to conduct electrical current while the train is stopped at the station.

14. A rapid transit system as set forth in claim 1 further comprising a wheel and rail suspension system for levitating said vehicle when said vehicle is in the immediate vicinity of a station.

15. A rapid transit system as set forth in claim 1 further comprising means for suspending said vacuum tube between a pair of stations at a pair of anchor structures located near each station, respectively, such that the path of the tube between the anchor structures is a catenary curve.

16. A rapid transit system as set forth in claim 15 wherein said means for suspending said vacuum tube between anchor structures comprising:

a tunnel in which said vacuum tube is suspended;

a plurality of main suspension cables extending along the inside of said tunnel, attached to the outside walls of said tube and anchored at the anchor structures;

a plurality of support cables attached to the upper portions of said tunnel which partially support said tube; and means for adjusting said support cables and main suspension cables for aligning said tube as required;

said main suspension cables having substantial longitudinal stress so that the tube is not deflected downward appreciably by the weight of a passing vehicle.

17. A rapid transit system as set forth in claim 16 wherein an alignment monitoring system is provided to monitor the tube alignment between stations.

18. A rapid transit system as set forth in claim 17 wherein said alignment system between said anchor structures comprises:

a plurality of electrically energized conducting cables suspended freely between adjacent anchor structures to trace out smooth catenary paths parallel to the catenary path of said vacuum tube guideway; and a plurality of spaced-apart conducting sensor rings attached to said tube and wherein said conducting cables pass through said conducting rings;

said conducting rings each having an inside diameter slightly greater than the outer diameter of said conducting cables so that no ring is in physical contact with said cable when said tube is in proper alignment and contacting said cables at misaligned tube sections thereby causing electrical current to flow between said rings and cable.

19. A rapid transit system as set forth in claim 17 wherein two vacuum tubes are independently suspended in a single tunnel between two stations to allow two-way traffic;

each of said tubes having its own independent suspension cables and alignment monitoring system.

20. a rapid transit system as set forth in claim 16 wherein said vacuum tube has a circular cross-section and further comprising:

support partition means extending longitudinally along the tube's interior essentially through its horizontal diameter so as to form two corridors with vehicles moving in opposite directions in each corridor at the same time to permit two-way traffic in the same vacuum tube.

21. A rapid transit system as set forth in claim 20 wherein each of said vehicles moving on upper level and lower level vacuum tube corridors is equipped with an escape system means by which passengers stranded between stations in a disabled vehicle can be safely rescued from it without having to pressurize the tube or without having to tow the train to the next station, said means comprising:
  a plurality of air-tight escape hatches mounted on the floor of each upper level vehicle and on the ceiling of each lower level vehicle and spaced apart so that when a lower level vehicle is directly below an upper level vehicle, the escape hatches on each side of the partition in each vehicle are opposite each other;
  a retractable, flexible tube mounted around each escape hatch for manual extension to engage and completely surround an opposite escape hatch to form an air-lock;
  means for allowing air into said air-lock for pressurizing it to atmospheric pressure; and
  means for opening each escape hatch after the air-lock is pressurized from either vehicle so that passengers can be evacuated, whereby every upper level vehicle can be used to rescue passengers stranded in a disabled lower level vehicle and every lower level vehicle can be used to rescue passengers stranded in a disabled upper level vehicle anywhere in the tube.

22. A rapid transit system as set forth in claim 16 wherein said anchor structure comprises:
  a cylindrical reinforced concrete foundation with inner diameter approximately equal to the diameter of said tunnel;
  a cylindrical steel suspension sleeve mounted inside said concrete foundation and anchored to it by a plurality of adjustable length stand-off rods with said vacuum tube passing through said sleeve; and
  means for anchoring said tube suspension cables to said suspension sleeve.

23. A rapid transit system as set forth in claim 15 wherein the tube path between adjacent anchor structures on each side of the station follow smooth transition curves such that the radius of curvature of the tube path from one station to the next station is a smooth, continuous and slowly varying function of distance along the tube.

24. A rapid transit system as set forth in claim 1 wherein said vehicle is composed of a train of detachably coupled cars;
  means for allowing said train to negotiate curves in both horizontal and vertical planes;
  means for pressurizing each car independently of all other cars in said train; and
  means for transferring passengers from one car to an adjacent car and sealing off each car from the remaining cars of said train without having to stop the train or without having to re-pressurize the vacuum tube.

25. A rapid transit system as set forth in claim 24 wherein a means for evacuating an entire train stranded between stations is provided by transferring its passengers into the train immediately ahead or behind the stranded train without having to re-pressurize the vacuum tube or without having to perform the evacuation by a special rescue vehicle.

26. A rapid transit system as set forth in claim 24 wherein said means for independently pressuring each car in said train comprises:
  a car coupling system that comprises an air-tight coupling seal around the end periphery of each car;
  air-tight bulkheads located near each end of each car such that the chamber formed by the bulkheads at the ends of a pair of coupled cars and the car hulls on each side of the air-tight coupling seal forms an air-lock between each pair of coupled cars;
  means for pressurizing or evacuating said air-lock independently of each adjacent car without disturbing the pressure environment in the interior of each adjacent car in the pair; and
  an air-tight pressure door in each bulkhead to allow passengers to enter or exit the air-lock from the interior of adjacent cars.

27. A rapid transit system as set forth in claim 26 wherein the pressure hull near each end of each car is composed of a slightly flexible material so that said air-tight coupling between adjacent cars forms an air-tight articulated section that allows said train of coupled cars to negotiate curves in both horizontal and vertical planes.

28. A rapid transit system as set forth in claim 1 further comprising means on the vehicle for recovering and storing excess potential energy when moving from one station at a higher elevation to another station at a lower elevation; and
  means for using the stored energy later in propelling the vehicle from a station at a lower elevation to a station at a higher elevation.

29. A rapid transit system as set forth in claim 28 wherein said means for recovering, storing and using excess kinetic energy derived from moving between stations of different elevations comprises:
  a reaction rail extending along the tube;
  a regenerative linear motor on the vehicle for regenerative braking and propulsion without physically contacting the reaction rail; and
  flywheel motor-alternator energy storage units located on-board said vehicle for transforming incoming electrical energy derived from regenerative vehicle braking into flywheel inertial energy for storage and for transforming stored flywheel inertial energy into electrical energy to power said linear motors.

30. A rapid transit system as set forth in claim 29 wherein an auxiliary lateral guidance system is provided for said linear motor and said vehicle such that the gap between said linear motor and said reaction rail can be significantly reduced, and comprising:
  a row of high coercivity permanent magnets extending along the length of said reaction rail with north and south poles oriented along parallel lines perpendicular to the surface of said reaction rail; and
  a plurality of U-shaped mild-steel channels mounted on said vehicle and aligned along a straight line and containing a plurality of high coercivity permanent magnets with north and south poles oriented parallel to those on said reaction rail such that the mild-steel channel conducts the magnetic flux of the magnets mounted therein to pole pieces so as to form a horizontal flux gap;

said U-shaped channels mounted on said vehicle such that said row of permanent magnets on the reaction rail passes inside said flux gaps of said mild-steel U-shaped channels;

the repulsion forces across the gaps keeping the linear motor and vehicle properly aligned laterally;

said channels being free to move slightly relative to each other in order to allow the vehicle to move smoothly along curves in both horizontal and vertical planes.

31. A rapid transit system as set forth in claim 30 wherein said permanent magnet lateral guidance means include means for controlling and dampening out horizontal oscillations comprising:

servo-controlled electromagnets fitted to some of said vehicle's guidance magnets; and inertial oscillation sensors on-board said vehicle that sense horizontal oscillations that control current feeding said electromagnets so as to dampen out possible horizontal oscillations.

32. A rapid transit system as set forth in claim 1 wherein the path of at least a portion of said tubes between adjacent stations comprises two continuously curving arcs sloping downwardly from each station separated by a straight horizontal path located at the maximum depth such that the entire path lies essentially in the vertical plane passing through the adjacent stations.

33. A rapid transit system as set forth in claim 1 further comprising means for increasing the vehicle's speed by using additional energy; and regenerative braking means for later recovering said energy during deceleration.

34. A rapid transit system as set forth in claim 1 wherein the means for evacuating and maintaining vacuum in said vacuum tube comprises high capacity continually operating vacuum pumps located near said stations.

35. A rapid transit system as set forth in claim 1 wherein the vehicle comprises a train of detachably coupled cars; and further comprising:

flywheel alternator-motor energy storage units on each car for supplying electrical power needed to operate all systems in the car while it is moving between stations;

means on each car for receiving electrical power to recharge said flywheel energy storage units from each station; and umbilical lines that connect adjacent cars so that electrical current and air can be circulated throughout the entire train or concentrated to a particular car if needed.

36. A method of operating a rapid transit system having an underground tube which slopes downwardly between a pair of stations comprising the steps of:

maintaining a vacuum in the tube;

suspending a vehicle in the tube by a magnetic suspension system;

gravitationally accelerating the suspended vehicle down the descending portion of the tube whereby substantially all of the vehicle's gravitational potential energy is converted to vehicle kinetic energy;

gravitationally decelerating the vehicle in the ascending portion of the tube whereby substantially all of the vehicle's kinetic energy is converted back into gravitational potential energy; and transferring passengers between a station and the interior of the vehicle when stopped at the station without removing the vehicle from the vacuum environment of the tube without pressurizing the tube.

37. A method of operating a rapid transit system as defined in claim 36 wherein said accelerating and decelerating steps comprise moving the vehicle through an underground tube that follows a continuous smooth curve lying essentially in the vertical plane passing through the stations.

38. A method of operating a rapid transit system as defined in claim 36 wherein said accelerating and decelerating steps comprise moving the vehicle through an underground tube that has two continuously curving arcs sloping downwardly from each station separated by a straight horizontal section located at the maximum depth such that the entire path lies essentially in the vertical plane passing through the stations.

39. A method of operating a rapid transit system as defined in claim 36 wherein said accelerating and decelerating steps comprise moving the vehicle through an underground tube that has two continuously curving arcs sloping downwardly from each station separated by a circular arc section having radius equal to the distance between the point of maximum tube depth and the earth's center.

40. A method of operating a rapid transit system as defined in claim 36 wherein said tube follows a catenary path in a vertical plane for a substantial portion of the distance between two adjacent stations.

41. A method of operating a rapid transit system as defined in claim 36 further comprising the steps of:

starting the vehicle at a station by on-board propulsion means using energy stored on-board the vehicle;

braking the vehicle at another station by on-board regenerative dynamic braking means; and storing the energy from the regenerative braking on-board the vehicle.

42. A method of operating a rapid transit system as defined in claim 41 wherein said on-board energy storage means comprises a flywheel inertial energy storage means and a motor/alternator means for storing and extracting energy from the flywheel means comprising the steps of:

spinning up the flywheel means during braking and slowing down the flywheel during starting.

43. A method of operating a rapid transit system as defined in claim 41 further comprising the steps of:

increasing the vehicle's speed while in transit between stations by on-board regenerative propulsion means using energy stored in an on-board energy storage system;

braking the vehicle while approaching a station by regenerative dynamic braking that returns energy to the on-board energy storage system.

44. A method of operating a rapid transit system as defined in claim 43 further comprising converting excess vehicle kinetic energy to flywheel inertial energy by regenerative braking at a relatively lower elevation station; and converting flywheel inertial energy into additional vehicle kinetic energy by auxiliary propulsion means so that it can climb to a higher station elevation having higher gravitational potential energy.

45. A method of operating a rapid transit system as defined in claim 43 wherein said on-board regenerative propulsion means comprises the steps of:

establishing a reaction rail inside the vacuum tube;
propelling the vehicle by a regenerative linear motor reacting against the reaction rail by drawing energy from an on-board energy storage system; and
braking the vehicle by regenerative dynamic braking by said linear motor and storing the recovered energy in the on-board energy storage system.

46. A method of operating a rapid transit system as defined in claim 45 further comprising the step of applying magnetic repulsive forces laterally relative to the vehicle's length for lateral stabilization of the vehicle.

47. A method of operating a rapid transit system as defined in claim 41 further comprising regeneratively decelerating the vehicle as it approaches each station so that it comes to a stop at a predetermined location.

48. A method of operating a rapid transit system as defined in claim 36 further comprising the additional steps of:
suspending the vehicle by a wheel and rail suspension system in the immediate vicinity of a station while moving at low speeds; and
levitating the vehicle by magnetic forces while moving at high speeds between stations.

49. A method of operating a rapid transit system as defined in claim 48 wherein said magnetic levitating comprises the steps of:
mutually repelling a plurality of permanent magnetic rails on-board the vehicle by magnetic repulsion forces against a plurality of magnetic rails in the tube.

50. A method of operating a rapid transit system as defined in claim 36 further comprising the additional steps of:
forming an air-lock between a car door and a tube door adjacent each car door;
pressurizing the air-lock to atmospheric pressure;
opening the car door and tube door after the air-lock has been pressurized for passenger transfer;
closing the car door and tube door and evacuating the air-lock after passenger transfer;
at least partially evacuating the air-lock by dumping residual air into a high volume, high vacuum storage tank; and
opening the air-lock prior to vehicle departure.

51. A pressurized rapid transit vehicle adapted for travel in a vacuum tube guideway composed of a train of detachably coupled, independently pressurized cars;
means for allowing said train to negotiate curves in both horizontal and vertical planes;
means for pressurizing each car independently of all other cars in said train, said pressurizing means comprising:
a car coupling system that comprises an air-tight coupling seal around the end periphery of each car;
air-tight bulkheads located near each end of each car such that the chamber formed by the bulkheads at the ends of a pair of coupled cars and the car hulls on each side of the air-tight coupling seal forms an airlock between each pair of coupled cars; and
means for pressurizing or evacuating said airlock independently of each adjacent car without disturbing the pressure environment in the interior of each adjacent car in the pair;
said airlock adapted for transferring passengers from one car to an adjacent car and sealing off each car from the remaining cars of said train without having to stop the train or without having to repressurize the vacuum tube guideway and comprising an airtight chamber between adjacent cars including a flexible articulated wall portion and an airtight pressure door at the end of each car communicating between the interior of such a car and the airtight chamber;
said airlocks partitioning said train into several independently pressurized car cabins.

52. A pressurized rapid transit vehicle as defined in claim 51 wherein a means for evacuating an entire train stranded between stations is provided by transferring its passengers into the train immediately ahead or behind the stranded train without having to repressurize the vacuum tube or without having to perform the evacuation by a special rescue vehicle.

53. A pressurized rapid transit vehicle as set forth in claim 51 wherein the pressure hull near each end of each car is composed of a slightly flexible material so that said air-tight coupling between adjacent cars forms an air-tight articulated section that allows said train of coupled cars to negotiate curves in both horizontal and vertical planes.

54. A rapid transit system comprising a tube and a plurality of vehicles adapted for travel through the tube, wherein said tube is partitioned along its horizontal mid-plane throughout its length forming two corridors, each said corridor adapted to guide a vehicle so as to allow two-way traffic in opposite directions through a single tube;
an escape system on each vehicle moving on upper and lower level corridors of said tube, said escape system being means by which passengers stranded between stations in a disabled vehicle can be safely rescued from it without requiring the passengers to enter a corridor guideway or without having to tow the vehicle to the next station, said means comprising:
a plurality of escape hatches mounted on the floor of each upper level vehicle and on the ceiling of each lower level vehicle and spaced apart so that when a lower level vehicle is directly below an upper level vehicle, the escape hatches on each side of the tube partition in each vehicle are opposite each other;
a retractable, flexible tube mounted around each escape hatch for manual extension to engage and completely surround an opposite escape hatch;
means for opening each escape hatch after engagement so that passengers can be evacuated without entering any guideway corridor, whereby every upper level vehicle can be used to rescue passengers stranded in a disabled lower level vehicle and every lower level vehicle can be used to rescue passengers stranded in a disabled upper level vehicle anywhere in the tube.

* * * * *